United States Patent
Orita

(10) Patent No.: US 9,605,750 B2
(45) Date of Patent: Mar. 28, 2017

(54) POWER TRANSMISSION DEVICE

(71) Applicant: HONDA MOTOR CO., LTD., Tokyo (JP)

(72) Inventor: Atsuo Orita, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 239 days.

(21) Appl. No.: 14/567,482

(22) Filed: Dec. 11, 2014

(65) Prior Publication Data

US 2015/0167830 A1  Jun. 18, 2015

(30) Foreign Application Priority Data

Dec. 17, 2013  (JP) .................................. 2013-259769

(51) Int. Cl.
| | |
|---|---|
| *F16H 25/20* | (2006.01) |
| *F16H 59/14* | (2006.01) |
| *F16H 25/22* | (2006.01) |
| *F16H 25/24* | (2006.01) |
| *F16H 1/16* | (2006.01) |

(52) U.S. Cl.
CPC ....... *F16H 59/141* (2013.01); *F16H 25/2204* (2013.01); *F16H 25/2427* (2013.01); *F16H 1/16* (2013.01); *F16H 2059/148* (2013.01); *Y10T 477/347* (2015.01)

(58) Field of Classification Search
CPC ............. F16H 59/141; F16H 2025/209; F16H 2025/2043; B25J 19/068; G05B 2219/39345
See application file for complete search history.

(56) References Cited

U.S. PATENT DOCUMENTS

| | | | | |
|---|---|---|---|---|
| 2,151,191 A | * | 3/1939 | Crane ..................... | B41J 19/32 400/11 |
| 3,049,936 A | * | 8/1962 | Schnell ................... | F16H 55/22 74/411 |
| 3,163,054 A | * | 12/1964 | Werner .................... | F16C 1/00 74/422 |
| 3,238,804 A | * | 3/1966 | Goodykoontz ........... | F16H 3/06 74/411 |
| 3,808,905 A | * | 5/1974 | Metzinger .............. | G04B 13/00 74/425 |
| 3,845,669 A | * | 11/1974 | Pickles ................... | F16H 19/04 74/422 |
| 4,565,104 A | * | 1/1986 | Akin ....................... | F16H 25/16 74/102 |

FOREIGN PATENT DOCUMENTS

| | | |
|---|---|---|
| JP | 63-40981 | 8/1988 |
| JP | 4107208 | 4/2008 |

* cited by examiner

*Primary Examiner* — Stacey Fluhart
(74) *Attorney, Agent, or Firm* — Rankin, Hill & Clark LLP

(57) ABSTRACT

A control device 11 of a power transmission device 1 sets an allowable range of a temporal change rate of an inter-element driving force transmitted between a driving element 4 (elastic member) and a driven element 5 such that the allowable range changes in accordance with an observed value of the amount of elastic deformation of the elastic member (driving element 4), and controls the inter-element driving force, via an actuator 2, in such a way as to restrict the temporal change rate of the inter-element driving force to be within the allowable range thus set.

9 Claims, 7 Drawing Sheets

POWER TRANSMISSION DEVICE

BACKGROUND OF THE INVENTION

1. Field of the Invention

The present invention relates to a power transmission device.

2. Description of the Related Art

As a power transmission device which transmits a driving force output from an actuator to a load member, such as a power transmission device for a joint drive mechanism of a robot, for example, one which has a spring or other elastic member disposed on its power transmission path is conventionally known (for example, see Japanese Patent No. 4107208 (hereinafter, referred to as "Patent Literature 1")).

In the power transmission device of this type, the fluctuations of the external force acting on the load side can be absorbed by elastic deformation of the elastic member. This can increase the flexibility of the power transmission device and also prevent the power transmission device from being damaged by unexpected fluctuations of the external force and the like.

Further, Japanese Examined Patent Application Publication No. 63-040981 (hereinafter, referred to as "Patent Literature 2"), for example, proposes a worm reduction gear in which the outer periphery of the worm to be meshed with the worm wheel is configured of a coil spring so as to prevent vibrations and noises.

SUMMARY OF THE INVENTION

Generally, it is often necessary for a power transmission device to change (for example, reduce) the rotational speed on the power transmission path. It is also often necessary for the power transmission device to perform conversion from linear motion to rotational motion, or vice versa (hereinafter, this may be referred to as "motion conversion"), on the power transmission path.

Here, in the power transmission device as disclosed in the aforesaid Patent Literature 1, the elastic member disposed on the power transmission path only transmits the elastic power from its one end side to the other end side. The member does not have the function of changing the rotational speed or the function of performing the motion conversion.

Therefore, in the power transmission device as disclosed in Patent Literature 1, in order to change the rotational speed or perform the motion conversion, a mechanism having the corresponding function is required separately from the elastic member. This often leads to an increase in size and/or complexity of the configuration of the power transmission device.

On the other hand, in the reduction gear disclosed in the aforesaid Patent Literature 2, the outer periphery of the worm is made up of the coil spring. This allows the worm to have both the function as the element for changing the rotational speed and the function as the elastic member.

Thus, in order to reduce the size of the configuration of the power transmission device which requires an elastic member on its power transmission path, it will be preferable to dispose two elements, like the worm and the worm wheel as in Patent Literature 2, on the power transmission path of the power transmission device, such that power transmission is performed elastically at the meshing portions that mesh with each other (hereinafter, the two elements may be referred to as "driving element" and "driven element").

In the power transmission device with such a configuration, however, when the elastic member which generates an elastic force at the meshing portions of the driving and driven elements deforms elastically, the meshing of the driving and driven elements may become inappropriate, in which case the power transmission between the elements may not be able to be performed appropriately.

For example, in the reduction gear disclosed in Patent Literature 2, if a load variation occurs in the state where the amount of compression (amount of elastic deformation) of the worm has become relatively large, the meshing of the worm as the driving element and the worm wheel as the driven element may become inappropriate and, thus, the power transmission between the worm and the worm wheel may not be performed normally.

The present invention has been accomplished in view of the foregoing, and it is an object of the present invention to provide a power transmission device which includes a driving element and a driven element having meshing portions where power transmission is performed elastically, and which can transmit power elastically between the driving and driven elements while maintaining the meshing of the elements appropriately.

In order to achieve the above object, the power transmission device of the present invention is a power transmission device which performs power transmission between an actuator which outputs a driving force and a load member which is to be driven, and the power transmission device includes:

a driving element and a driven element disposed on a path for the power transmission as elements responsible for the power transmission on the path, the driving and driven elements respectively having teeth and tooth grooves meshed with each other, the driving and driven elements being configured such that the power transmission at the meshing portions is performed via an elastic force which is generated by elastic deformation of an elastic member; and a control device that controls the amount of elastic deformation of the elastic member via the actuator to thereby control an inter-element driving force which is a driving force transmitted from the driving element to the driven element, wherein the control device includes an allowable range setting section that sets an inter-element driving force change rate allowable range as an allowable range of a temporal change rate of the inter-element driving force such that the allowable range changes in accordance with an observed value of the elastic deformation amount of the elastic member, and the control device is configured to control the inter-element driving force in such a way as to restrict the temporal change rate of the inter-element driving force to be within the inter-element driving force change rate allowable range set by the allowable range setting section (first invention).

It should be noted that, in the present specification, the "observed value" of an arbitrary state quantity such as the aforesaid elastic deformation amount means a detected value or an estimated value of the actual value of the state quantity. In this case, the "detected value" means an actual value of the state quantity which is a value detected by an appropriate sensor. The "estimated value" means a value which is estimated from a detected value of at least one state quantity having correlation with the state quantity, on the basis of the correlation, or it means a pseudo estimated value (for example, a desired value) which can be considered to coincide with, or almost coincide with, the actual value of the state quantity.

According to the first invention described above, the allowable range setting section sets the inter-element driving force change rate allowable range in accordance with the observed value of the elastic deformation amount of the elastic member. Therefore, the inter-element driving force change rate allowable range (specifically, the width, upper limit, lower limit or the like of the inter-element driving force change rate allowable range) can be set variably such that power transmission between the driving element and the driven element at the meshing portions can be performed appropriately with an arbitrary elastic deformation amount of the elastic member.

In the control by the control device, the inter-element driving force is controlled in such a way as to restrict the temporal change rate of the inter-element driving force to be within the inter-element driving force change rate allowable range.

It should be noted that such a control of the inter-element driving force can be implemented, for example, in the following manner. When the temporal change rate of the actual inter-element driving force recognized from, for example, the observed value of the elastic deformation amount of the elastic member falls outside the inter-element driving force change rate allowable range, the output of the actuator can be adjusted so as to cause the temporal change rate of the actual inter-element driving force to return to be within the inter-element driving force change rate allowable range.

Therefore, according to the first invention, it is possible to adjust the temporal change rate of the inter-element driving force and, hence, the temporal change rate of the elastic deformation amount of the elastic member in such a manner that the meshing of the driving element and the driven element at the meshing portions can be maintained in a state where the power transmission at the meshing portions can be performed appropriately.

As such, according to the first invention, it is possible to transmit power elastically between the driving element and the driven element, while maintaining the meshing of the elements appropriately.

In the power transmission device having the driving and driven elements, generally, if it is attempted to quickly change the inter-element driving force in the state where the elastic deformation amount of the elastic member is relatively large, the meshing state of the driving and driven elements may become inappropriate. As a result, it is likely to become unable to perform the power transmission between the elements appropriately. Such a trend becomes more noticeable as the elastic deformation amount of the elastic member becomes relatively larger.

In view of the foregoing, in the first invention, it is preferable that the allowable range setting section is configured to set the inter-element driving force change rate allowable range such that the inter-element driving force change rate allowable range becomes narrower as a magnitude of the observed value of the elastic deformation amount of the elastic member becomes larger (second invention).

According to the second invention, the magnitude of the inter-element driving force change rate can be restricted to be smaller as the magnitude of the elastic deformation amount of the elastic member is larger. Therefore, it is possible to effectively restrict the inter-element driving force change rate (and, hence, the temporal change rate of the elastic deformation amount of the elastic member), in conformity with the actual elastic deformation amount of the elastic member, such that the power transmission at the meshing portions of the driving and driven elements will not be impaired.

In the second invention, it is preferable that the allowable range setting section is configured to set the inter-element driving force change rate allowable range such that, in a case where the magnitude of the observed value of the elastic deformation amount of the elastic member takes a value falling within a prescribed range which is smaller than a setting value of a maximum allowable deformation amount of the elastic member, a center value of the inter-element driving force change rate allowable range becomes a value in a direction of increasing the elastic deformation amount (third invention).

It should be noted that the maximum allowable deformation amount means the maximum amount of deformation of the elastic member that is allowable for ensuring appropriate power transmission at the meshing portions.

Here, the situation where the magnitude of the observed value of the elastic deformation amount of the elastic member falls within the aforesaid prescribed range corresponds to a situation where the magnitude of the elastic deformation amount is smaller than the maximum allowable deformation amount and the magnitude of the elastic deformation amount can be further increased with no problem. In such a situation, the meshing state of the meshing portions is liable to become inappropriate in the case where the inter-element driving force change rate takes a large value in a direction of decreasing the magnitude of the elastic deformation amount of the elastic member, as compared to the case where it takes a large value in a direction of further increasing the magnitude of the elastic deformation amount of the elastic member.

According to the third invention, however, the inter-element driving force change rate allowable range is set as described above. Therefore, in the situation where the magnitude of the observed value of the elastic deformation amount of the elastic member falls within the aforesaid prescribed range, the magnitude of the inter-element driving force change rate is restricted to be smaller in the case where the inter-element driving force change rate takes a value in the direction of decreasing the magnitude of the elastic deformation amount of the elastic member, as compared to the case where it takes a value in the direction of further increasing the magnitude of the elastic deformation amount of the elastic member.

On the other hand, the restriction on the magnitude of the inter-element driving force change rate is more relaxed in the case where the inter-element driving force change rate takes a value in the direction of further increasing the magnitude of the elastic deformation amount of the elastic member, as compared to the case where it takes a value in the direction of decreasing the magnitude of the elastic deformation amount of the elastic member.

Therefore, in the situation where the magnitude of the observed value of the elastic deformation amount of the elastic member falls within the aforesaid prescribed range, the inter-element driving force change rate (and, hence, the temporal change rate of the elastic deformation amount of the elastic member) can be restricted appropriately, only to the extent necessary, to prevent the power transmission at the meshing portions of the driving and driven elements from being impaired.

Further, in the third invention described above, it is preferable that the allowable range setting section is configured to set the inter-element driving force change rate allowable range such that, in a case where the magnitude of the observed value of the elastic deformation amount of the elastic member takes a value larger than the values within the prescribed range, the center value of the inter-element driving force change rate allowable range becomes a value in a direction of decreasing the elastic deformation amount (fourth invention).

Here, the situation where the magnitude of the observed value of the elastic deformation amount of the elastic member takes a value larger than the values within the aforesaid prescribed range corresponds to the situation where the magnitude of the elastic deformation amount is close to, or equal to, the maximum allowable deformation amount. In such a situation, when the inter-element driving force change rate takes a value in the direction of further increasing the magnitude of the elastic deformation amount of the elastic member, the magnitude of the elastic deformation amount of the elastic member is liable to reach or exceed the setting value of the maximum allowable deformation amount.

According to the fourth invention, however, the inter-element driving force change rate allowable range is set as described above. Therefore, in the situation where the magnitude of the observed value of the elastic deformation amount of the elastic member takes a value larger than those within the aforesaid prescribed range, the magnitude of the inter-element driving force change rate is restricted to be sufficiently small or zero.

On the other hand, the restriction on the magnitude of the inter-element driving force change rate is more relaxed in the case where the inter-element driving force change rate takes a value in the direction of decreasing the magnitude of the elastic deformation amount of the elastic member, as compared to the case where it takes a value in the direction of further increasing the magnitude of the elastic deformation amount of the elastic member.

Therefore, in the situation where the magnitude of the observed value of the elastic deformation amount of the elastic member takes a value larger than those within the aforesaid prescribed range, the elastic deformation amount of the elastic member can be restricted appropriately, so as not to become excessively large, and also, the inter-element driving force change rate (and, hence, the temporal change rate of the elastic deformation amount of the elastic member) can be restricted appropriately, to prevent the power transmission at the meshing portions of the driving and driven elements from being impaired.

In the first through fourth inventions described above, an electric motor, for example, can be adopted as the actuator. In this case, preferably, the control device further includes an inter-element driving force upper limit setting section that sets an upper limit of the magnitude of the inter-element driving force variably, in accordance with an observed value of an operating speed of an output section of the electric motor, within a range of not larger than a maximum allowable value for the magnitude of the inter-element driving force which is defined by a preset maximum allowable deformation amount of the elastic member, and the control device is configured to control the inter-element driving force in such a way as to restrict the temporal change rate of the inter-element driving force to be within the inter-element driving force change rate allowable range set by the allowable range setting section and also to restrict the magnitude of the inter-element driving force to be equal to or smaller than un upper limit set by the inter-element driving force upper limit setting section (fifth invention).

It should be noted that, in the fifth invention, the electric motor may be either a rotary electric motor or a direct-acting electric motor (linear motor). In a rotary electric motor, the operating speed of the output section means the rotational speed of the rotor of the electric motor, or the rotational speed (proportional to the rotational speed of the rotor) of the rotating section which is connected to the rotor via a speed converter such as a speed reducer of the like. In a direct-acting motor, the operating speed of the output section means the translational speed of the direct-acting section.

Here, generally, the driving force that an electric motor can output decreases with increasing operating speed of its output section.

Thus, in the fifth invention, the inter-element driving force upper limit setting section sets the upper limit of the magnitude of the inter-element driving force variably, in accordance with the observed value of the operating speed of the output section of the electric motor, within the range of not larger than the maximum allowable value for the magnitude of the inter-element driving force that is defined by the maximum allowable deformation amount set in advance for the elastic member.

Then, the control device restricts the temporal change rate of the inter-element driving force to within the inter-element driving force change rate allowable range, and also controls the inter-element driving force such that the magnitude of the inter-element driving force is restricted not to exceed the upper limit set by the inter-element driving force upper limit setting section.

Accordingly, it is possible to maintain the meshing state of the driving and driven elements in a state where power transmission at the meshing portions can be performed appropriately, while restricting the inter-element driving force change rate, and further restricting the magnitude of the inter-element driving force within the range of the driving force that the electric motor can output in accordance with the aforesaid operating speed.

In the aforesaid first through fifth inventions, the driving element and the driven element of the power transmission device can adopt, for example, the following aspects.

In the first aspect, the driving element is a worm and the driven element is a worm wheel meshed with the worm, and an outer periphery of the worm meshing with the worm wheel is made up of the elastic member that is elastically deformable in a shaft center direction of the worm (sixth invention).

Further, in the second aspect, the driving element is a nut of a ball screw mechanism and the driven element is a screw shaft of the ball screw mechanism, and an outer periphery of the screw shaft meshing with the nut via balls is configured of the elastic member that is elastically deformable in a shaft center direction of the screw shaft (seventh invention).

Further, in the third aspect, the driving element is one of a nut and a screw shaft of a ball screw mechanism and the driven element is the other of the nut and the screw shaft of the ball screw mechanism, and balls interposed between the nut and the screw shaft are each configured of the elastic member that is elastically deformable in a shaft center direction of the screw shaft (eighth invention).

Further, in the fourth aspect, the driving element is a flex spline of a wave gear device and the driven element is a circular spline of the wave gear device, and the flex spline constitutes the elastic member (ninth invention).

In any of the above-described aspects, according to the present invention, it is possible to perform power transmission between the driving element and the driven element, while maintaining the meshing state of the driving and driven elements at the meshing portions in an appropriate state.

BRIEF DESCRIPTION OF THE DRAWINGS

2 is a block diagram showing the functions of a control device included in the power transmission device of the embodiment.

DESCRIPTION OF THE PREFERRED EMBODIMENTS

First Embodiment

A first embodiment of the present invention will be described below with reference to FIGS. 1 to 5.

Figure 1:
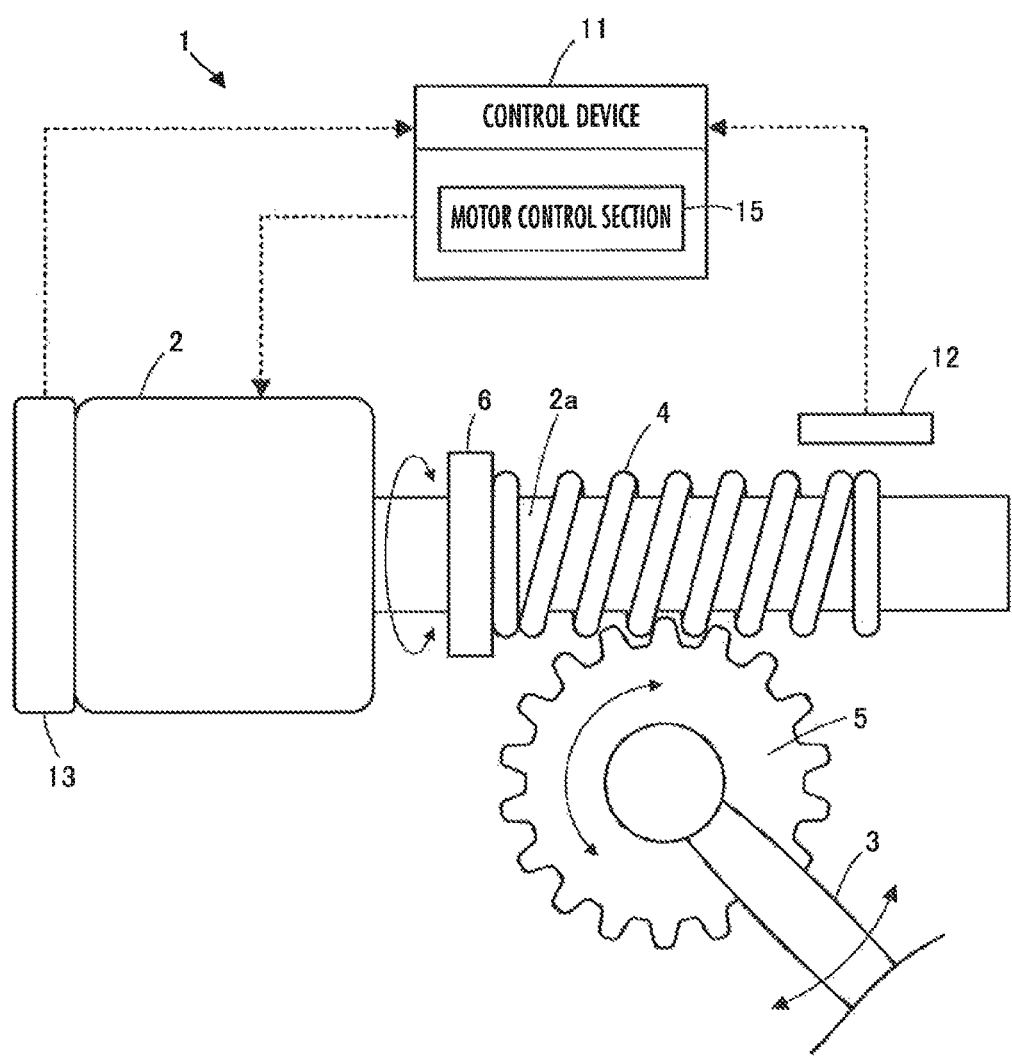
FIG. 1 shows the configuration of a power transmission device of a first embodiment of the present invention, FIG.

Referring to FIG. 1, a power transmission device 1 of the present embodiment is a device which performs power transmission between an actuator 2 and a load member 3 which is to be driven. This power transmission device 1 includes, on a power transmission path between the actuator 2 and the load member 3, a spring worm 4 and a worm wheel 5 serving as a driving element and a driven element having meshing portions that mesh with each other.

The power transmission device 1 is thus configured to transmit the driving force, output from the actuator 2, to the load member 3 via the spring worm 4 as the driving element and the worm wheel 5 as the driven element.

In the present embodiment, the actuator 2 is an electric motor as a rotary actuator. Hereinafter, the actuator 2 will be referred to as the electric motor 2. This electric motor 2 has an output shaft (rotary drive shaft) 2a which is rotatable unitarily with the rotor (not shown) of the electric motor 2. The rotor or the output shaft 2a of the electric motor 2 corresponds to the output section of the electric motor in the present invention.

The spring worm 4 has the function as an elastic member and the function as a worm. The spring worm 4 as the elastic member is an elastic member which is formed by spirally winding a wire member made of a metal material or the like, or, an elastic member in the form of coil spring. Therefore, the spring worm 4 can expand and compress elastically in its shaft center direction.

Further, the spring worm 4 as the worm has teeth (screw teeth) formed with the spiral wire member as its constituent element, and also has tooth grooves each formed between the wire member portions adjacent to each other in the shaft center direction of the spring worm 4.

The spring worm 4 is coaxially fitted onto the output shaft (rotary drive shaft) 2a which can rotate unitarily with the rotor of the electric motor 2. The spring worm 4 has its one end fixed to a flanged spring seat 6, which is in turn fixedly attached to the output shaft 2a. This enables the spring worm 4 to rotate unitarily with the rotor and the output shaft 2a of the electric motor 2.

Further, the rest of the spring worm 4, other than its one end, is not fixed to the output shaft 2a of the electric motor 2, so it is slidable in the shaft center direction with respect to the output shaft 2a. This enables the spring worm 4 to expand and compress elastically in the shaft center direction of the output shaft 2a.

The worm wheel 5 is a gear wheel which has a plurality of projections as teeth, arranged on its outer periphery at regular pitches in the circumferential direction, and tooth grooves each formed between the adjacent teeth. The worm wheel 5 has high rigidity.

The worm wheel 5 is pivotally and rotatably supported about its shaft center (in FIG. 1, about the shaft center perpendicular to the paper plane) which is orthogonal to the shaft center direction of the spring worm 4. The worm wheel 5 is meshed with the spring worm 4, with the teeth on the outer periphery of the worm wheel 5 fitted into the tooth grooves of the spring worm 4.

The load member 3 is connected to the worm wheel 5 so as to be able to rotate unitarily with the worm wheel 5. The load member 3 may be an arbitrary structure or mechanism. For example, in the case where the power transmission device 1 is used as a power transmission device for driving a joint of a robot, the load member 3 is a link mechanism or the like.

The above has described the mechanical structure of the power transmission device 1 of the present embodiment.

In the power transmission device 1 configured as described above, when the electric motor 2 is started (to generate an output torque), the spring worm 4 attempts to rotate unitarily with the output shaft 2a of the electric motor 2.

At this time, the spring worm 4 expands or compresses in accordance with the load (load torque) which acts on the worm wheel 5 from the load member 3 side, so the driving force (driving torque) is transmitted elastically from the spring worm 4 to the worm wheel 5. The driving force is further transmitted from the worm wheel 5 to the load member 3. Accordingly, the power is transmitted from the electric motor 2 to the load member 3.

In this case, the driving force acting on the worm wheel 5 from the spring worm 4 corresponds to the amount of expansion/compression (amount of elastic deformation) of the spring worm 4. Specifically, when the amount of expansion/compression of the spring worm 4 (from its natural length condition) is denoted as DX and the driving force (driving torque) acting on the worm wheel 5 from the spring worm 4 is denoted as PW, then the relationship between DX and PW is expressed by the following expression (1).

$$PW = DX \times Ke \times Rh \quad (1)$$

In the expression (1), Ke denotes a stiffness coefficient (so-called spring constant) which represents sensitivity of the change in elastic force of the spring worm 4 to the change in expansion/compression amount DX of the spring worm 4 (i.e. the amount of change of the elastic force per unit change amount of DX), and Rh denotes an effective rolling radius of the worm wheel 5.

It should be noted that the expansion/compression amount DX is of positive polarity in one of the compressing and expanding directions of the spring worm 4, and of negative polarity in the other direction. In the following, for convenience of explanation, it will be defined that the amount of expansion/compression in the compressing direction (i.e. the amount of compression) of the spring worm 4 is of positive polarity, and the amount of expansion/compression in the expanding direction (i.e. the amount of expansion) is of negative polarity. In this case, the positive direction of the driving force PW defined by the expression (1) corresponds to the clockwise direction of the worm wheel 5 in FIG. 1.

As indicated by the expression (1), the driving force PW acting on the worm wheel 5 from the spring worm 4 is proportional to the expansion/compression amount DX of the spring worm 4. Further, the direction (polarity) of the driving force PW changes in accordance with the polarity of the expansion/compression amount DX.

Therefore, controlling the expansion/compression amount DX of the spring worm 4 makes it possible to control the driving force (driving torque) PW transmitted from the spring worm 4 to the worm wheel 5 and, hence, the driving force transmitted from the electric motor 2 to the load member 3.

Further, in the state where the driving force PW transmitted from the spring worm 4 to the worm wheel 5 and the load acting on the worm wheel 5 from the load member 3 side are balanced with each other, when the load applied varies, the spring worm 4 expands or compresses in accordance with the variation. Therefore, the kinetic energy of the load member 3 associated with the variation of the applied load is absorbed as it is converted to the elastic energy of the spring worm 4.

In order to control the driving force transmitted from the spring worm 4 to the worm wheel 5, the power transmission device 1 of the present embodiment includes a control device 11, which is composed of an electronic circuit unit including a CPU, a RAM, a ROM, and so on, a displacement sensor 12 for observing the amount of expansion/compression of the spring worm 4, and a speed sensor 13 for observing the rotational speed of the rotor (or the output shaft 2a) of the electric motor 2. The outputs (detection signals) from the displacement sensor 12 and the speed sensor 13 are input to the control device 11.

The displacement sensor 12 is a sensor which outputs a detection signal corresponding to the position of the free end (opposite to the end fixed to the spring seat 6) of the spring worm 4 in its shaft center direction. For the displacement sensor 12, a known displacement sensor, such as an optical sensor or an eddy current sensor, for example, is used.

The position of the free end of the spring worm 4, which is indicated by the output of the displacement sensor 12, is more specifically the relative displacement amount of the free end with respect to its position in the natural length condition of the spring worm 4 (in other words, the amount of expansion/compression of the spring worm 4 in its shaft center direction).

Therefore, it is possible to observe the actual amount of expansion/compression of the spring worm 4 from the output of the displacement sensor 12.

Supplementally, the displacement sensor 12 may be configured to output, for example, a signal corresponding to the pitch of the teeth (adjacent to each other in the shaft center direction) of the spring worm 4 in an area from the meshing portions of the spring worm 4 and the worm wheel 5 to the aforesaid spring seat 6. In this case, the amount of expansion/compression of the spring worm 4 corresponds to the above-described pitch. It is thus possible to estimate the amount of expansion/compression of the spring worm 4 from the observed value of the pitch.

The speed sensor 13 is a sensor which outputs a detection signal corresponding to the rotational speed (angular velocity) of the rotor (or the output shaft 2a) of the electric motor 2. For the speed sensor 13, for example, a rotary encoder, a resolver or the like mounted on the electric motor 2 is used.

The control device 11 includes, as a function implemented by an installed program or as a function implemented by a hardware configuration, a motor control section 15 which is responsible for operation control of the electric motor 2.

The motor control section 15 uses an observed value of the actual amount of expansion/compression of the spring worm 4, which is successively recognized from an output of the displacement sensor 12, and an observed value of the actual rotational speed of the rotor of the electric motor 2, which is successively recognized from an output of the speed sensor 13, to determine a control manipulated variable (control input) of the electric motor 2 successively, as will be described later. In the present embodiment, the control manipulated variable is, for example, a desired rotational angular acceleration of the rotor of the electric motor 2. It should be noted that the control manipulated variable may be a desired torque of the electric motor 2, for example.

The motor control section 15 then controls the electric current flowing through the electric motor 2, in accordance with the determined control manipulated variable, to perform the operation control of the electric motor 2.

In this case, the operation control of the electric motor 2 is performed in such a way as to restrict the magnitude of the driving force (driving torque) transmitted from the spring worm 4 to the worm wheel 5, or the temporal change rate of the driving force, to within a required range. It should be noted that restricting the magnitude of the driving force (driving torque) to be within a required range more specifically means that, when the magnitude of the driving force falls outside the required range, the magnitude of the driving force is forcibly returned to be within the required range. The same applies to the case of restricting the temporal change rate of the driving force to be within a required range.

The control processing performed by the motor control section 15 will now be described in detail. It should be noted that, in the following description, when an actual value or its observed value (detected value or estimated value) of an arbitrary state quantity, such as a driving force, a speed, or the like, is indicated using reference characters, the suffix "act" is added to the reference characters.

Figure 2:
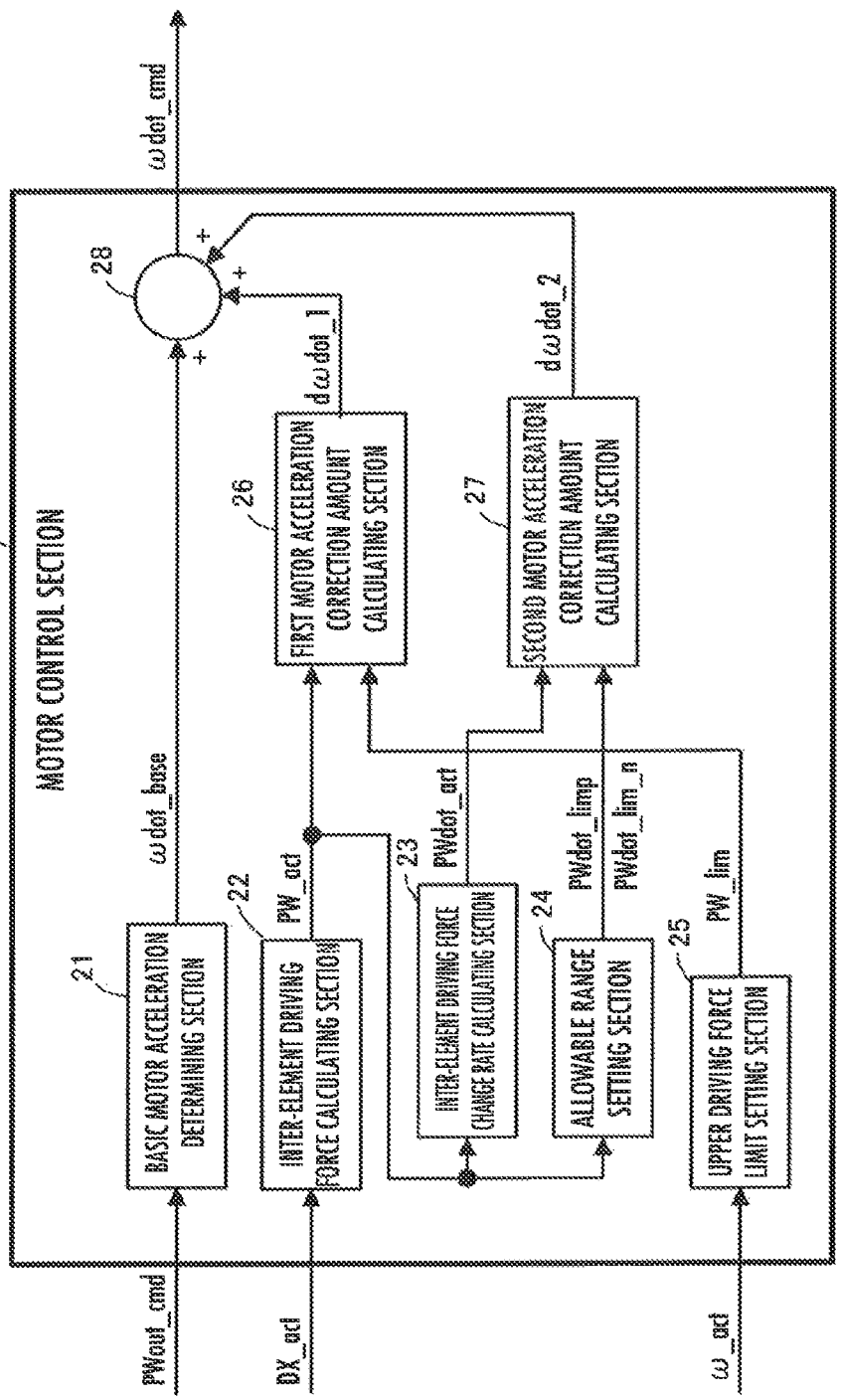

Referring to FIG. 2, the motor control section 15 includes, as its functions: a basic motor acceleration determining section 21 which determines a basic motor acceleration $\omega dot\_base$ as a basic desired value of the rotational angular acceleration $\omega dot$ (hereinafter, referred to as "motor acceleration $\omega dot$") of the rotor of the electric motor 2; an inter-element driving force calculating section 22 which acquires an observed value of an actual value PW_act of the driving force PW (hereinafter, referred to as "inter-element driving force PW") transmitted from the spring worm 4 to the worm wheel 5; an inter-element driving force change rate calculating section 23 which acquires an observed value of an actual value PWdot_act of an inter-element driving force change rate PWdot, which is the temporal change rate (amount of change per unit time) of the inter-element driving force PW; an allowable range setting section 24 which sets an allowable range (hereinafter, referred to as "inter-element driving force change rate allowable range") for the inter-element driving force change rate PWdot; an upper driving force limit setting section 25 which sets an upper limit PW_lim (hereinafter, referred to as "upper driving force limit PW_lim") of the magnitude (absolute value) of the inter-element driving force PW; a first motor acceleration correction amount calculating section 26 and a second motor acceleration correction amount calculating section 27 which calculate a first motor acceleration correction amount $d\omega dot\_1$ and a second motor acceleration correction amount $d\omega dot\_2$, respectively, for correcting the basic motor acceleration $\omega dot\_base$; and a desired motor acceleration calculating section 28 which performs arithmetic processing of correcting the basic motor acceleration ωdot_base using the first motor acceleration correction amount dωdot_1 and the second motor acceleration correction amount dωdot_2, to determine a desired motor acceleration ωdot_cmd.

Here, the allowable range setting section 24 and the upper driving force limit setting section 25 described above correspond to the allowable range setting section and the inter-element driving force upper limit setting section, respectively, in the present invention.

It should be noted that the reference characters in the parentheses in FIG. 2 are for other embodiments which will be described later.

The motor control section 15 determines the desired motor acceleration ωdot_cmd by carrying out the processing in each of the above-described functional sections at prescribed control processing cycles.

More specifically, at each control processing cycle, the motor control section 15 first carries out the processing in the basic motor acceleration determining section 21, the inter-element driving force calculating section 22, the inter-element driving force change rate calculating section 23, the allowable range setting section 24, and the upper driving force limit setting section 25.

The basic motor acceleration determining section 21 successively receives a desired load driving force PWout_cmd, which is a desired value of the driving force (driving torque) applied to the load member 3.

The desired load driving force PWout_cmd is determined successively in the control device 11 in accordance with the motional state of the load member 3 or the like, or it is supplied to the control device 11 from an external server or the like. In the present embodiment, the load member 3 rotates unitarily with the worm wheel 5, and therefore, the desired load driving force PWout_cmd becomes a desired value of the driving torque of the worm wheel 5.

At each control processing cycle, the basic motor acceleration determining section 21 determines a basic motor acceleration ωdot_base from the input desired load driving force PWout_cmd, in accordance with a preset map or arithmetic expression.

It should be noted that the way of determining the basic motor acceleration ωdot_base is not limited to the above-described technique; an arbitrary technique may be adopted. For example, the basic motor acceleration ωdot_base may be determined in the following manner. At each control processing cycle, the basic motor acceleration determining section 21 divides the current desired load driving force PWout_cmd by the effective rolling radius Rh (which is a predetermined constant value) of the worm wheel 5, and then divides the obtained value (which corresponds to a desired value of the elastic force generated by the spring worm 4) by the preset stiffness coefficient Ke (which is a predetermined constant value) of the spring worm 4, to determine a desired expansion/compression amount DX_cmd as a desired value of the elastic deformation amount of the spring worm 4.

Further, the basic motor acceleration determining section 21 multiplies a deviation of the current actual expansion/compression amount DX_act (observed value) of the spring worm 4 from the desired expansion/compression amount DX_cmd of the spring worm 4 by a gain of a prescribed value (preset value), to determine a desired rotational speed ω_cmd of the rotor of the electric motor 2.

The basic motor acceleration determining section 21 then multiplies a deviation of the current actual rotational speed ω_act (observed value) of the rotor of the electric motor 2 from the desired rotational speed ω_cmd of the rotor by a gain of a prescribed value (preset value), to thereby determine the basic motor acceleration ωdot_base.

Alternatively, the technique explained in U.S. Pat. No. 5,910,720, for example, may be used to determine the basic motor acceleration ωdot_base.

Next, the inter-element driving force calculating section 22 successively receives an observed value of the actual expansion/compression amount DX_act of the spring worm 4. At each control processing cycle, the inter-element driving force calculating section 22 multiplies the current expansion/compression amount DX_act (observed value) by the stiffness coefficient Ke of the spring worm 4 and the effective rolling radius Rh of the worm wheel 5, and determines the calculated value (=DX_act×Ke×Rh) as an inter-element driving force PW_act (observed value). That is, the value of PW that is calculated from the aforesaid expression (1) with DX_act substituted for DX on the right side of the expression is determined as the inter-element driving force PW_act (observed value).

Next, the inter-element driving force change rate calculating section 23 successively receives the inter-element driving force PW_act calculated by the inter-element driving force calculating section 22. At each control processing cycle, the inter-element driving force change rate calculating section 23 carries out a differential operation of calculating a temporal change rate of the inter-element driving force PW_act, to determine an inter-element driving force change rate PWdot_act (observed value).

It should be noted that, after the temporal change rate of the inter-element driving force PW_act is calculated by the differential operation, the calculated value may be subjected to low-pass filtering, and the resultant value may be obtained as the inter-element driving force change rate PWdot_act (observed value).

Further, the inter-element driving force change rate calculating section 23 may calculate the inter-element driving force change rate PWdot_act by multiplying a temporal change rate of the expansion/compression amount DX_act of the spring worm 4 (or the value obtained by subjecting this temporal change rate to low-pass filtering) by the aforesaid stiffness coefficient Ke and effective rolling radius Rh. In this case, the inter-element driving force change rate calculating section 23 successively receives the expansion/compression amount DX_act of the spring worm 4, instead of the inter-element driving force PW_act.

Next, the upper driving force limit setting section 25 successively receives an observed value of the actual rotational speed ω_act of the rotor of the electric motor 2. At each control processing cycle, first, the upper driving force limit setting section 25 determines, from the current rotational speed ω_act, an upper limit ωdot_lim (≥0) of the magnitude (absolute value) of the rotational angular acceleration ωdot of the rotor of the electric motor 2, by a preset map (or arithmetic expression), in such a characteristic as shown by the graph in FIG. 3, for example.

Figure 3:
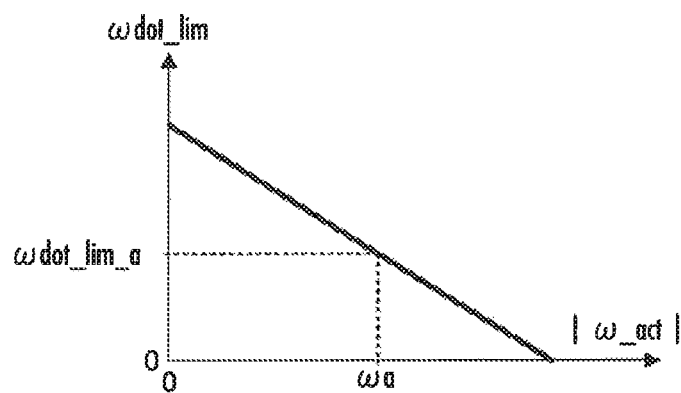
FIG. 3 is a graph illustrating the processing performed by an upper driving force limit setting section shown in FIG. 2.

Here, generally, as the rotational speed of the rotor of the electric motor 2 increases, the maximum value of the driving torque that the electric motor 2 can output decreases, and consequently, the maximum value of the magnitude of the rotational angular acceleration that the rotor can achieve decreases as well. Therefore, the upper limit ωdot_lim of the magnitude of the rotational angular acceleration ωdot of the rotor of the electric motor 2 is determined such that it becomes smaller as the magnitude (absolute value |ω_act|) of the rotational speed ω_act of the rotor becomes larger, as shown in FIG. 3.

Figure 4:
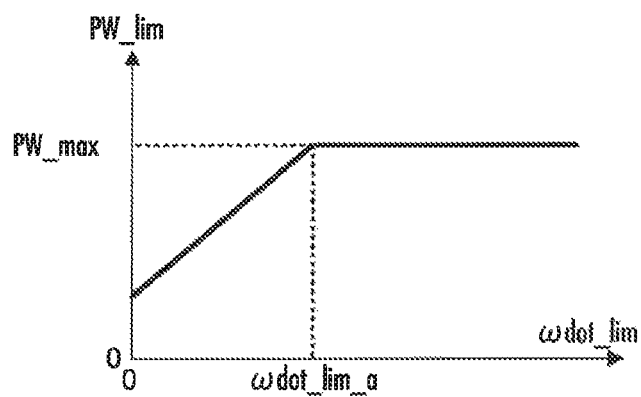
FIG. 4 is another graph illustrating the processing performed by the upper driving force limit setting section shown in FIG. 2.

Next, the upper driving force limit setting section 25 determines, from ωdot_lim determined as described above, an upper driving force limit PW_lim (≥0) of the magnitude (absolute value) of the inter-element driving force PW, by a preset map (or arithmetic expression), in such a characteristic as shown by the graph in FIG. 4, for example.

Specifically, in the case where the upper limit ωdot_lim of the magnitude of the rotational angular acceleration ωdot of the rotor of the electric motor 2 is not smaller than a prescribed value ωdot_lim_a determined in advance (i.e. when ωdot_lim≥ωdot_lim_a), a maximum allowable driving force PW_max, determined in advance as the maximum allowable value of the elastic force that may be generated by elastic deformation of the spring worm 4, is determined as the upper driving force limit PW_lim.

Here, the maximum allowable driving force PW_max described above is an elastic force which the spring worm 4 generates with a maximum amount of expansion/compression (amount of elastic deformation in the expanding or compressing direction) of the spring worm 4 that is allowable for maintaining the meshing state of the spring worm 4 and the worm wheel 5 in an appropriate state (where power transmission at the meshing portions can be performed normally).

That is, the maximum allowable driving force PW_max is the maximum elastic force of the spring worm 4 that is allowable for maintaining the above-described meshing state in an appropriate state. Such a maximum allowable driving force PW_max is set in advance by design or through experiments. More specifically, the maximum allowable driving force PW_max is set with some margin such that, even if the actual inter-element driving force PW_act slightly exceeds the maximum allowable driving force PW_max, the meshing state can be maintained in an appropriate state.

It should be noted that the state where ωdot_lim≥ωdot_lim_a corresponds to the state where the electric motor 2 can output an output torque that makes it possible to maintain the magnitude of the inter-element driving force PW_act at the maximum allowable driving force PW_max (or, maintain the magnitude of the expansion/compression amount DX_act of the spring worm 4 at the magnitude of the expansion/compression amount (hereinafter, referred to as "maximum allowable expansion/compression amount DX_max") corresponding to the maximum allowable driving force PW_max).

In the case where ωdot_lim is smaller than the above-described prescribed value ωdot_lim_a, the electric motor 2 becomes unable to output the output torque that makes it possible to maintain the magnitude of the inter-element driving force PW_act at the maximum allowable driving force PW_max (or, maintain the magnitude of the expansion/compression amount DX_act of the spring worm 4 at the magnitude of the maximum allowable expansion/compression amount DX_max). Therefore, the upper driving force limit PW_lim is determined such that it decreases from the maximum allowable driving force PW_max as ωdot_lim becomes smaller.

In the above-described manner, the upper driving force limit setting section 25 determines the upper driving force limit PW_lim in accordance with the rotational speed ω_act (observed value) of the rotor of the electric motor 2.

Supplementally, the upper driving force limit setting section 25 may determine the upper driving force limit PW_lim directly in accordance with the rotational speed ω_act (observed value) of the rotor of the electric motor 2, without determining the upper limit ωdot_lim of the magnitude of the rotational angular acceleration ωdot of the rotor.

Specifically, in the case where the magnitude of the rotational speed ω_act (observed value) of the rotor is not larger than a prescribed rotational speed ωa (see FIG. 3) corresponding to the prescribed value ωdot_lim_a related to the aforesaid upper limit ωdot_lim, the aforesaid maximum allowable driving force PW_max is determined as the upper driving force limit PW_lim. Further, in the case where the magnitude of ω_act (observed value) is larger than the prescribed rotational speed ωa, the upper driving force limit PW_lim is determined such that it decreases from the maximum allowable driving force PW_max as ω_act becomes larger.

Further, in the present embodiment, the upper driving force limit PW_lim is the same irrespective of whether the polarity (direction) of the inter-element driving force PW_act is positive or negative. Alternatively, the upper driving force limit PW_lim in the case where the inter-element driving force PW_act is of positive polarity and the upper driving force limit PW_lim in the case where the inter-element driving force PW_act is of negative polarity may be set to different values. The same applies to the aforesaid maximum allowable driving force PW_max or to the maximum allowable expansion/compression amount DX_max of the spring worm 4 corresponding to the maximum allowable driving force PW_max.

Next, the aforesaid allowable range setting section 24 successively receives the inter-element driving force PW_act calculated by the inter-element driving force calculating section 22. The allowable range setting section 24 sets, from the current inter-element driving force PW_act, an inter-element driving force change rate allowable range, by a preset map (or arithmetic expression), in such a characteristic as shown by the graph in FIG. 5, for example.

It should be noted that, in the present embodiment, it is defined that the positive direction of each of the inter-element driving force PW and the inter-element driving force change rate PWdot corresponds to the direction (in FIG. 1, the clockwise direction of the worm wheel 5) in which the driving force acts on the worm wheel 5 when the expansion/compression amount DX of the spring worm 4 is of positive polarity (i.e. the expansion/compression amount in the compressing direction).

The inter-element driving force change rate allowable range is set by determining a set of its upper limit PWdot_lim_p (≥0) and lower limit PWdot_lim_n (≤0), or by determining parameters that define the upper limit PWdot_lim_p and the lower limit PWdot_lim_n (for example, a set of the center value and width of the inter-element driving force change rate allowable range).

Figure 5:
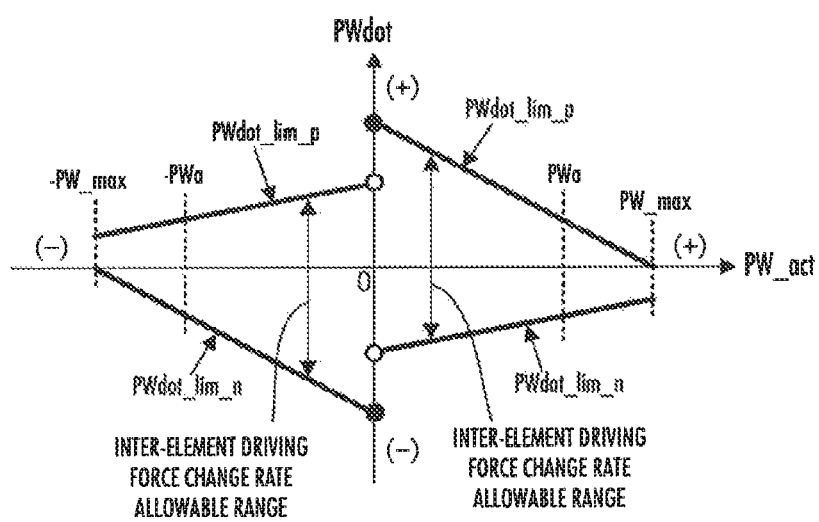
FIG. 5 is a graph illustrating the processing performed by an allowable range setting section shown in FIG. 2.

As shown in FIG. 5, the inter-element driving force change rate allowable range is set to have the following characteristics 1 to 4.

(Characteristic 1) The width (=PWdot_lim_p−PWdot_lim_n) of the inter-element driving force change rate allowable range becomes narrower as the magnitude of the inter-element driving force PW_act is larger (in other words, as the magnitude of the expansion/compression amount DX_act of the spring worm 4 is larger).

(Characteristic 2) In the case where the magnitude (absolute value) of the inter-element driving force PW_act is smaller than a prescribed positive value PWa (specifically, when 0<PW_act<PWa or when −PWa<PW_act<0), i.e. in the case where the magnitude of the expansion/compression amount DX_act of the spring worm 4 is not so large compared to the maximum allowable expansion/compression amount DX_max, the center value (=(PWdot_lim_p+PWdot_lim_n)/2) of the inter-element driving force change rate allowable range becomes a value in the direction of increasing the magnitude (absolute value) of the inter-element driving force PW_act (i.e. a value of the same polarity as PW_act).

(Characteristic 3) In the case where the magnitude (absolute value) of the inter-element driving force PW_act is larger than the prescribed value PWa (specifically, when PWa<PW_act or when −PWa>PW_act), i.e. in the case where the magnitude of the expansion/compression amount DX_act of the spring worm 4 is close to the maximum allowable expansion/compression amount DX_max, the center value of the inter-element driving force change rate allowable range becomes a value in the direction of decreasing the magnitude (absolute value) of the inter-element driving force PW_act (i.e. a value of the polarity opposite to that of PW_act).

(Characteristic 4) In the case where the magnitude (absolute value) of the inter-element driving force PW_act coincides with the maximum allowable driving force PW_max, neither the upper limit PWdot_lim_p nor the lower limit PWdot_lim_n of the inter-element driving force change rate allowable range takes a value of the same polarity (direction) as the inter-element driving force PW_act. More specifically, in the case where the inter-element driving force PW_act is of positive polarity and its magnitude (absolute value) coincides with the maximum allowable driving force PW_max, the following is satisfied: $0 \geq PWdot\_lim\_p > PWdot\_lim\_n$. In the case where the inter-element driving force PW_act is of negative polarity and its magnitude (absolute value) coincides with the maximum allowable driving force PW_max, the following is satisfied: $PWdot\_lim\_p > PWdot\_lim\_n \geq 0$.

It should be noted that, in the present embodiment, regarding the above-described characteristic 4, in the case where the inter-element driving force PW_act is of positive polarity and its magnitude (absolute value) coincides with the maximum allowable driving force PW_max, the upper limit PWdot_lim_p is set to 0. In the case where the inter-element driving force PW_act is of negative polarity and its magnitude (absolute value) coincides with the maximum allowable driving force PW_max, the lower limit PWdot_lim_n is set to 0.

Further, the inter-element driving force change rate allowable range in the case where the inter-element driving force PW_act is zero is set, for example, such that its center value becomes zero and its width becomes the greatest.

At each control processing cycle, the motor control section 15 carries out the processing in the basic motor acceleration determining section 21, the inter-element driving force calculating section 22, the inter-element driving force change rate calculating section 23, the allowable range setting section 24, and the upper driving force limit setting section 25 in the above-described manner, and thereafter, the motor control section 15 carries out the processing in the first motor acceleration correction amount calculating section 26 and the second motor acceleration correction amount calculating section 27.

The first motor acceleration correction amount calculating section 26 receives the inter-element driving force PW_act, calculated in the inter-element driving force calculating section 22, and the upper driving force limit PW_lim, calculated in the upper driving force limit setting section 25.

Then, in the case where the magnitude (absolute value) of the inter-element driving force PW_act is not larger than the upper driving force limit PW_lim (i.e. when |PW_act|≤PW_lim), the first motor acceleration correction amount calculating section 26 sets the first motor acceleration correction amount dωdot_1 to zero, as indicated by the following expression (2a).

Further, in the case where the inter-element driving force PW_act takes a positive value and its magnitude (absolute value) is larger than the upper driving force limit PW_lim (i.e. when PW_act>0 and PW_act>PW_lim), the first motor acceleration correction amount calculating section 26 determines the value obtained by multiplying a difference between PW_act and its positive polarity side limit (upper limit) PW_lim by a gain G1 of a prescribed value, as the first motor acceleration correction amount dωdot_1, as indicated by the following expression (2b).

Further, in the case where the inter-element driving force PW_act takes a negative value and its magnitude (absolute value) is larger than the upper driving force limit PW_lim (i.e. when PW_act<0 and PW_act<−PW_lim), the first motor acceleration correction amount calculating section 26 determines the value obtained by multiplying a difference between PW_act and its negative polarity side limit (lower limit)−PW_lim by the gain G1 of a prescribed positive value, as the first motor acceleration correction amount dωdot_1, as indicated by the following expression (2c).

Accordingly, in the case where the magnitude (absolute value) of PW_act is larger than PW_lim, the first motor acceleration correction amount dωdot_1 is determined in accordance with the amount by which the magnitude of PW_act has exceeded PW_lim.

When |PW_act|≤PW_lim:

$$d\omega dot\_1 = 0 \tag{2a}$$

When PW_act>0 and PW_act>PW_lim:

$$d\omega dot\_1 = G1 \times (PW\_act - PW\_lim) \tag{2b}$$

When PW_act<0 and PW_act<−PW_lim:

$$d\omega dot\_1 = G1 \times (PW\_act - (-PW\_lim)) \tag{2c}$$

Further, the second motor acceleration correction amount calculating section 27 receives the inter-element driving force change rate PWdot_act, calculated in the inter-element driving force change rate calculating section 23, and the upper limit PWdot_lim_p and the lower limit PWdot_lim_n of the inter-element driving force change rate allowable range, set in the allowable range setting section 24.

In the case where the inter-element driving force change rate PWdot_act takes a value falling within the inter-element driving force change rate allowable range (i.e. when PWdot_lim_p≥PWdot_act≥PWdot_lim_n), the second motor acceleration correction amount calculating section 27 sets the second motor acceleration correction amount dωdot_2 to zero, as indicated by the following expression (3a).

Further, in the case where the inter-element driving force change rate PWdot_act takes a positive value larger than the upper limit PWdot_lim_p of the inter-element driving force change rate allowable range (i.e. when PWdot_act>PWdot_lim_p), the second motor acceleration correction amount calculating section 27 determines the value obtained by multiplying a difference between PWdot_act and PWdot_lim_p by a gain G2 of a prescribed value, as the second motor acceleration correction amount dωdot_2, as indicated by the following expression (3b).

Further, in the case where the inter-element driving force change rate PWdot_act takes a negative value smaller than the lower limit PWdot_lim_n of the inter-element driving force change rate allowable range (i.e. when PWdot_act<PWdot_lim_n), the second motor acceleration correction amount calculating section 27 determines the value obtained by multiplying a difference between PWdot_act and PWdot_lim_n by the gain G2 of a prescribed positive value, as the second motor acceleration correction amount dωdot_2, as indicated by the following expression (3c).

Accordingly, in the case where PWdot_act falls outside the inter-element driving force change rate allowable range, the second motor acceleration correction amount dωdot_2 is determined in accordance with the amount by which PWdot_ act deviates from the allowable range.

When PWdot_lim_p≥PWdot_act≥PWdot_lim_n:

$$d\omega dot\_2=0 \quad (3a)$$

When PWdot_act>PWdot_lim_p:

$$d\omega dot\_2=G2\times(PWdot\_act-PWdot\_lim\_p) \quad (3b)$$

When PWdot_act<PWdot_lim_n:

$$d\omega dot\_2=G2\times(PWdot\_act-PWdot\_lim\_n) \quad (3c)$$

The above-described gain G2 is a preset value determined in advance. However, it may be set, for example, such that the value of the gain G2 becomes larger as the amount by which PWdot_act deviates from the inter-element driving force change rate allowable range becomes larger.

Next, the motor control section 15 carries out the processing in the desired motor acceleration calculating section 28. The desired motor acceleration calculating section 28 receives the basic motor acceleration ωdot_base, determined in the basic motor acceleration determining section 21, and the first motor acceleration correction amount dωdot_1 and the second motor acceleration correction amount dωdot_2, calculated in the first motor acceleration correction amount calculating section 26 and the second motor acceleration correction amount calculating section 27, respectively.

The desired motor acceleration calculating section 28 then determines the value obtained by adding the first motor acceleration correction amount dωdot_1 and the second motor acceleration correction amount dωdot_2 to the basic motor acceleration ωdot_base, as a desired motor acceleration ωdot_cmd, as indicated by the following expression (4):

$$\omega dot\_cmd=\omega dot\_base+d\omega dot\_1+d\omega dot\_2 \quad (4)$$

The motor control section 15 controls the electric current flowing through the electric motor 2, in accordance with the desired motor acceleration ωdot_cmd determined as described above. Specifically, the motor control section 15 multiplies the desired motor acceleration ωdot_cmd by a prescribed value corresponding to the inertia of the rotating system of the rotor of the electric motor 2, to determine a desired torque (i.e. a desired value of the output torque) of the electric motor 2. The motor control section 15 then determines a desired value of the electric current flowing through the electric motor 2, in accordance with the desired torque determined. Further, the motor control section 15 performs feedback control on the electric current to cause the electric current (observed value) actually flowing through the electric motor to converge to the desired value.

In this manner, the rotor of the electric motor 2 is controlled to rotate at the desired motor acceleration ωdot_cmd.

According to the embodiment described above, basically, the rotational amount of the rotor of the electric motor 2 and, hence, the expansion/compression amount DX_act of the spring worm 4 are controlled such that the driving force actually applied to the load member 3 from the electric motor 2 side via the worm wheel 5 tracks (converges to) the desired load driving force PWout_cmd. This state is, in other words, the state where the desired motor acceleration ωdot_cmd being successively determined by the motor control section 15 coincides with the basic motor acceleration ωdot_base (i.e. the state where the first motor acceleration correction amount dωdot_1 and the second motor acceleration correction amount dωdot_2 both become zero).

When the load applied varies in this state, the spring worm 4 expands or compresses correspondingly, resulting in a variation in the inter-element driving force PW_act transmitted from the spring worm 4 to the worm wheel 5.

With such a variation in the inter-element driving force PW_act, the magnitude (absolute value) of the inter-element driving force PW_act may exceed the upper driving force limit PW_lim set in the upper driving force limit setting section 25 (i.e. the following may hold: PW_act>PW_lim or PW_acK<−PW_lim).

In such a case, the first motor acceleration correction amount dωdot_1 calculated by the aforesaid first motor acceleration correction amount calculating section 26 becomes a value other than zero, so the desired motor acceleration ωdot_cmd is corrected by the first motor acceleration correction amount dωdot_1. Thus, the spring worm 4 is rotatively driven by the electric motor 2 in such a way as to decrease the magnitude of the expansion/compression amount DX_act (and, hence, the elastic force) of the spring worm 4.

As a result, the magnitude (absolute value) of the expansion/compression amount DX_act of the spring worm 4 is prevented from becoming larger than the maximum allowable expansion/compression amount DX_max corresponding to the aforesaid maximum allowable driving force PW_max. Consequently, the expansion/compression amount DX_act of the spring worm 4 is adjusted such that the meshing of the spring worm 4 and the worm wheel 5 is maintained in an appropriate state (where power transmission at the meshing portions can be performed normally).

Further, in the case where the rotational speed ω_act of the rotor of the electric motor 2 becomes higher than the aforesaid prescribed rotational speed ωa, the upper driving force limit PW_lim is set such that its magnitude becomes smaller than the maximum allowable driving force PW_max. This restricts the desired motor acceleration ωdot_cmd such that the output torque of the electric motor 2 will not exceed the torque that can be actually achieved during high-speed rotation of the rotor. As a result, it is possible for the electric motor 2 to rotatively drive the spring worm 4 appropriately.

Further, if the load applied varies relatively quickly, the spring worm 4 attempts to expand or compress quickly in correspondence therewith. This leads to an increase in magnitude of the inter-element driving force change rate PWdot_act.

Accordingly, there may be a case where the inter-element driving force change rate PWdot_act falls outside the inter-element driving force change rate allowable range set in the aforesaid allowable range setting section 24 (i.e. the following may hold: PWdot_act>PWdot_lim_p or PWdot_act<PWdot_lim_n).

In such a case, the second motor acceleration correction amount dωdot_2 calculated by the aforesaid second motor acceleration correction amount calculating section 27 becomes a value other than zero, so the desired motor acceleration ωdot_cmd is corrected by the second motor acceleration correction amount dωdot_2 (≠0). Thus, the spring worm 4 is rotatively driven by the electric motor 2 such that the inter-element driving force change rate PWdot_act returns to within the inter-element driving force change rate allowable range and, furthermore, such that the magnitude of the temporal change rate of the expansion/compression amount DX_act of the spring worm 4 will not become excessively large.

Here, if the spring worm 4 attempts to expand or compress quickly in response to a quick variation in the applied load, the meshing of the spring worm 4 and the worm wheel 5 may become inappropriate; for example, the meshing may be released unfavorably. Such an inconvenience is more likely to occur as the magnitude of the expansion/compression amount DX_act of the spring worm 4 is larger.

In the present embodiment, however, the inter-element driving force change rate allowable range is set to have the aforesaid characteristic 1. Therefore, as the magnitude of the inter-element driving force PW_act is larger, the magnitude of the inter-element driving force change rate PWdot_act and, hence, the magnitude of the temporal change rate of the expansion/compression amount DX_act of the spring worm 4 are restricted to be smaller.

Further, in the state where the spring worm 4 has been compressed or expanded to a certain extent (specifically, in the compressed state corresponding to the range of 0<PW_act<PWa or in the expanded state corresponding to the range of 0>PW_act>−PWa in FIG. 5), the meshing of the spring worm 4 and the worm wheel 5 is more likely to become inappropriate in the case where the load applied varies quickly in the direction of decreasing the magnitude of the expansion/compression amount DX_act of the spring worm 4, as compared to the case where the load applied varies quickly in the direction of further increasing the magnitude of the expansion/compression amount DX_act of the spring worm 4.

In the present embodiment, however, the inter-element driving force change rate allowable range is set to have the aforesaid characteristic 2. Therefore, in the state where the spring worm 4 has been compressed to a certain extent as described above, the absolute value of the lower limit PWdot_lim_n of the inter-element driving force change rate allowable range becomes smaller than the absolute value of the upper limit PWdot_lim_p thereof.

Therefore, the magnitude of the inter-element driving force change rate PWdot_act and, hence, the magnitude of the temporal change rate of the expansion/compression amount DX_act of the spring worm 4 are restricted to be smaller in the case where the inter-element driving force change rate PWdot_act takes a value (<0) in the direction of decreasing the magnitude of the expansion/compression amount DX_act (>0) of the spring worm 4 (or, decreasing the magnitude of the inter-element driving force PW_act (>0)), as compared to the case where it takes a value (>0) in the direction of increasing the magnitude of the expansion/compression amount DX_act (>0) of the spring worm 4 (or, increasing the magnitude of the inter-element driving force PW_act (>0)).

Further, in the state where the spring worm 4 has been expanded to a certain extent as described above, the absolute value of the upper limit PWdot_lim_p of the inter-element driving force change rate allowable range becomes smaller than the absolute value of the lower limit PWdot_lim_n thereof, according to the aforesaid characteristic 2.

Therefore, the magnitude of the inter-element driving force change rate PWdot_act and, hence, the magnitude of the temporal change rate of the expansion/compression amount DX_act of the spring worm 4 are restricted to be smaller in the case where the inter-element driving force change rate PWdot_act takes a value (>0) in the direction of decreasing the magnitude of the expansion/compression amount DX_act (<0) of the spring worm 4 (or, decreasing the magnitude of the inter-element driving force PW_act (<0)), as compared to the case where it takes a value (<0) in the direction of increasing the magnitude of the expansion/compression amount DX_act (<0) of the spring worm 4 (or, increasing the magnitude of the inter-element driving force PW_act (<0)).

Furthermore, in the state where the magnitude (absolute value) of the expansion/compression amount DX_act of the spring worm 4 has become close to the aforesaid maximum allowable expansion/compression amount DX_max (specifically, in the compressed state corresponding to the range of PW_max≥PW_act>PWa or in the expanded state corresponding to the range of −PW_max≤PW_act<−PWa in FIG. 5), the meshing of the spring worm 4 and the worm wheel 5 is more likely to become inappropriate in the case where the load applied varies quickly in the direction of further increasing the magnitude of the expansion/compression amount DX_act of the spring worm 4, as compared to the case where the load applied varies quickly in the direction of decreasing the magnitude of the expansion/compression amount DX_act of the spring worm 4. Furthermore, when the load applied varies quickly in the direction of further increasing the magnitude of the expansion/compression amount DX_act of the spring worm 4, there is a higher probability that the magnitude of the expansion/compression amount DX_act exceeds the aforesaid maximum allowable expansion/compression amount DX_max.

In the present embodiment, however, the inter-element driving force change rate allowable range is set to have the aforesaid characteristic 3. Therefore, in the state where the spring worm 4 has been compressed by the amount of expansion/compression close to the maximum allowable expansion/compression amount DX_max as described above, the absolute value of the upper limit PWdot_lim_p of the inter-element driving force change rate allowable range becomes smaller than the absolute value of the lower limit PWdot_lim_n thereof.

Therefore, the magnitude of the inter-element driving force change rate PWdot_act and, hence, the magnitude of the temporal change rate of the expansion/compression amount DX_act of the spring worm 4 are restricted to be smaller in the case where the inter-element driving force change rate PWdot_act takes a value (>0) in the direction of increasing the magnitude of the expansion/compression amount DX_act (>0) of the spring worm 4 (or, increasing the magnitude of the inter-element driving force PW_act (>0)), as compared to the case where it takes a value (<0) in the direction of decreasing the magnitude of the expansion/compression amount DX_act (>0) of the spring worm 4 (or, decreasing the magnitude of the inter-element driving force PW_act (>0)).

Further, in the state where the spring worm 4 has been expanded by the amount of expansion/compression close to the maximum allowable expansion/compression amount DX_max as described above, the absolute value of the lower limit PWdot_lim_n of the inter-element driving force change rate allowable range becomes smaller than the absolute value of the upper limit PWdot_lim_p thereof.

Therefore, the magnitude of the inter-element driving force change rate PWdot_act and, hence, the magnitude of the temporal change rate of the expansion/compression amount DX_act of the spring worm 4 are restricted to be smaller in the case where the inter-element driving force change rate PWdot_act takes a value (<0) in the direction of increasing the magnitude of the expansion/compression amount DX_act (<0) of the spring worm 4 (or, increasing the magnitude of the inter-element driving force PW_act (<0)), as compared to the case where it takes a value (>0) in the direction of decreasing the magnitude of the expansion/compression amount DX_act (<0) of the spring worm 4 (or, decreasing the magnitude of the inter-element driving force PW_act (<0)).

Furthermore, the inter-element driving force change rate allowable range is set to have the aforesaid characteristic 4. Therefore, in the state where the magnitude of the expansion/compression amount DX_act of the spring worm 4 has reached the maximum allowable expansion/compression amount DX_max, the inter-element driving force change rate PWdot_act is restricted so as not to take a value in the direction of further increasing the expansion/compression amount DX_act (i.e. a value of the same direction (polarity) as PW_act).

In the above-described manner, the inter-element driving force change rate PWdot_act is restricted in such a way as to prevent it from falling outside the inter-element driving force change rate allowable range that is set in accordance with the inter-element driving force PW_act. Accordingly, the temporal change rate of the expansion/compression amount DX_act of the spring worm 4 is adjusted such that the meshing of the spring worm 4 and the worm wheel 5 is maintained in an appropriate state (where power transmission at the meshing portions can be performed normally).

Therefore, according to the power transmission device 1 of the present embodiment, it is possible to transmit power from the electric motor 2 to the load member 3 smoothly, while maintaining the meshing of the spring worm 4 and the worm wheel 5 in an appropriate state.

It should be noted that, in the present embodiment, the end (in FIG. 1, the right end) of the spring worm 4 on the side opposite to the spring seat 6 side remains free. Alternatively, the end may be fixedly secured to the output shaft 2a of the electric motor 2.

This configuration causes the two portions of the spring worm 4 that extend to one end and to the other end, respectively, from its meshing portion with the worm wheel 5 to expand or compress in the directions opposite to each other.

In this case, the amount of expansion/compression of the portion of the spring worm 4 extending to the one end from its meshing portion with the worm wheel 5 and that of the portion extending to the other end can be observed, for example, by measuring the pitches of the screw teeth of the spring worm 4 in the respective portions using appropriate displacement sensors. Consequently, the driving force (inter-element driving force) acting on the worm wheel 5 from the spring worm 4 can be observed in accordance with the observed amounts of expansion/compression of the spring worm 4.

Second Embodiment

A second embodiment of the present invention will now be described with reference to FIGS. 6 and 2. In the present embodiment, the functional configuration of the motor control section is identical to that of the first embodiment, and therefore, FIG. 2 is used as the block diagram for explanation thereof.

Figure 6:
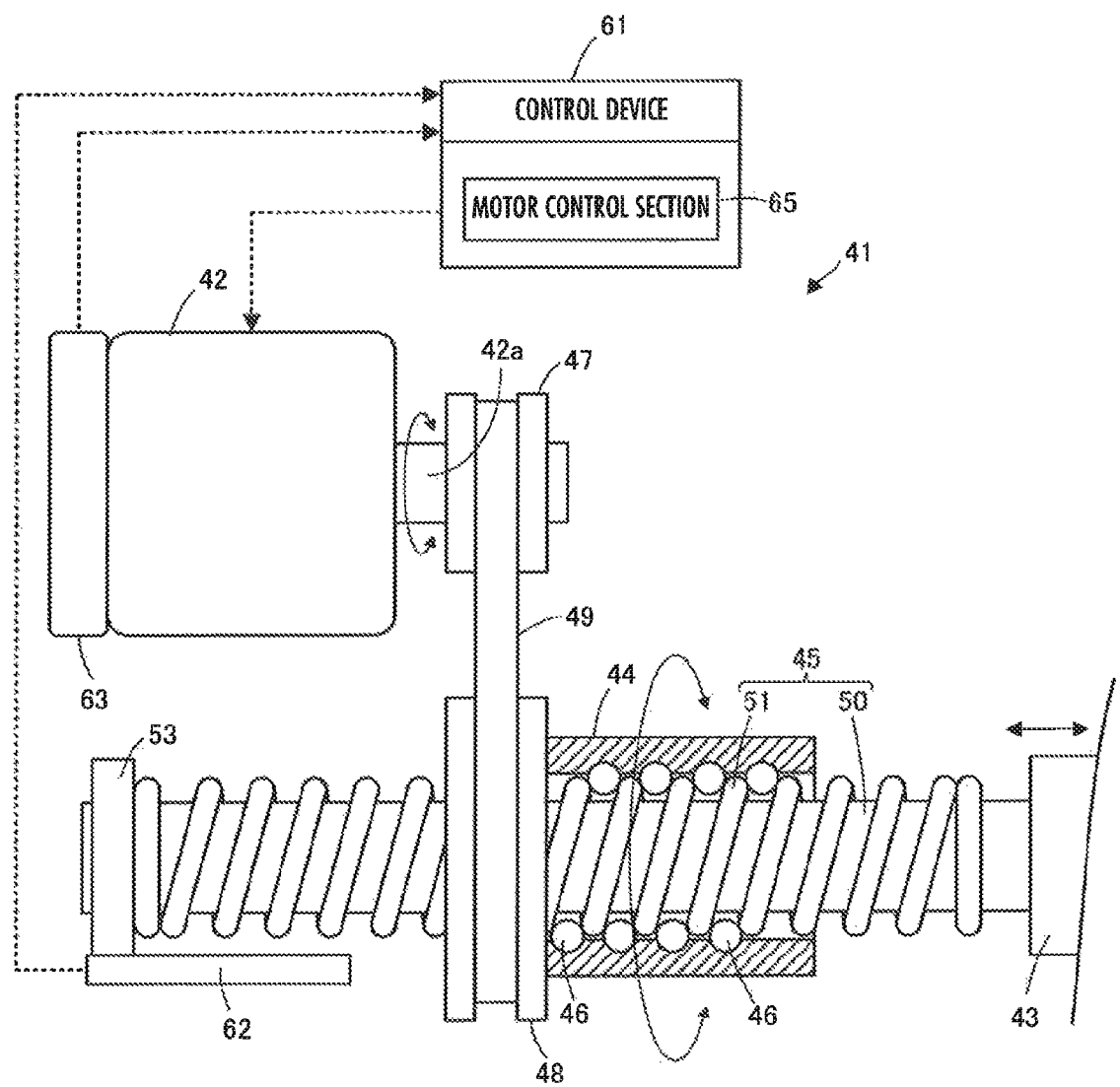
FIG. 6 shows the configuration of a power transmission device of a second embodiment of the present invention.

Referring to FIG. 6, a power transmission device 41 according the present embodiment is a device which performs power transmission between an actuator 42 and a load member 43 which is to be driven. This power transmission device 41 includes, on a power transmission path between the actuator 42 and the load member 43, a nut 44 and a screw shaft 45 constituting a ball screw mechanism, the nut 44 and the screw shaft 45 serving as a driving element and a driven element having meshing portions that mesh with each other.

The nut 44 and the screw shaft 45 are meshed with each other via a plurality of balls 46 which are rollably interposed between the inner periphery of the nut 44 and the outer periphery of the screw shaft 45. Accordingly, the power transmission device 41 is configured to transmit the driving force, output from the actuator 42, to the load member 43 via the nut 44 as the driving element and the screw shaft 45 as the driven element.

In this case, in the present embodiment, the nut 44 is rotatably supported via a bearing (not shown) or the like. Further, the screw shaft 45 is supported, via a guide rail (not shown) or the like, so as to be able to move linearly in its shaft center direction. Therefore, as the nut 44 is rotatively driven, the screw shaft 45 moves linearly together with the load member 43.

The actuator 42 is an electric motor as a rotary actuator. Hereinafter, the actuator 42 will be referred to as the electric motor 42. This electric motor 42 has an output shaft 42a which is rotatable unitarily with a rotor (not shown) of the motor, as in the first embodiment. The rotor or the output shaft 42a of the electric motor 42 corresponds to the output section of the electric motor in the present invention.

The nut 44 has spiral screw teeth formed on its inner peripheral surface. The portion between the screw teeth (projections) adjacent to each other in the shaft center direction of the nut 44 constitutes a tooth groove.

To this nut 44, a driving force (rotative driving force) is transmitted from the electric motor 42, via a belt and pulley power transmission mechanism made up of a driving pulley 47, a driven pulley 48, and a pulley belt 49. The driving pulley 47 is coaxially secured to the output shaft 42a of the electric motor 42 so as to be rotatable unitarily with the output shaft 42a. The driven pulley 48 is coaxially secured to one end of the nut 44.

It should be noted that the power transmission from the electric motor 42 to the nut 44 may be performed by a power transmission mechanism of the type other than the belt and pulley mechanism. For example, a mechanism which transmits power via sprockets and chains, or a mechanism which transmits power via gears may be used.

The screw shaft 45 includes a rod-shaped body 50 (hereinafter, referred to as "screw shaft body 50"), and a coil spring 51 as an elastic member which is coaxially fitted onto the screw shaft body 50. Teeth (screw teeth) are formed on the outer periphery of the screw shaft body 50 by a spiral wire member constituting the coil spring 51. A tooth groove is formed between the teeth adjacent to each other in the shaft center direction of the screw shaft body 50 (the shaft center direction of the screw shaft 45).

The coil spring 51 of the screw shaft 45 has its one end fixed to a flanged spring seat 53, which is in turn fixedly attached to one end of the screw shaft body 50.

The screw shaft body 50 and the coil spring 51 penetrate through the center of the nut 44, and protrude on both sides in the shaft center direction of the nut 44.

Inside the nut 44, a plurality of balls 46 are fitted between the tooth grooves formed between the wire member portions of the coil spring 51 and the tooth grooves on the inner peripheral surface of the nut 44. In this manner, the nut 44 and the screw shaft 45 are meshed with each other via the balls 46. It should be noted that the nut 44 and the balls 46 have high rigidity.

Further, the rest of the coil spring 51, other than its one end on the spring seat 53 side, is not fixed to the screw shaft body 50, so that it is slidable in the shaft center direction with respect to the screw shaft body 50. Therefore, as the screw shaft body 50 moves in the shaft center direction with respect to the nut 44, the portion of the coil spring 51 protruding from the nut 44 on the spring seat 53 side can expand and compress elastically in correspondence therewith.

The load member 43 is connected to the screw shaft body 50 so as to be able to move (linearly) in the shaft center direction of the screw shaft body 50, unitarily with the screw shaft body 50. The load member 43 may be an arbitrary structure or mechanism.

The above has described the mechanical structure of the power transmission device 41 of the present embodiment.

In the power transmission device 41 configured as described above, when the electric motor 42 is started (to generate an output torque), the nut 44 attempts to rotate in conjunction with the output shaft 42*a* of the electric motor 42. Consequently, the screw shaft 45 attempts to move (linearly) in the shaft center direction.

At this time, the portion of the coil spring 51 between the nut 44 and the spring seat 53 expands or compresses in accordance with the load (translational force in the shaft center direction of the screw shaft body 50) which acts on the screw shaft body 50 from the load member 43 side, so the driving force (translational driving force) is transmitted elastically from the nut 44 to the screw shaft body 50 via the coil spring 51 of the screw shaft 45. The driving force is further transmitted from the screw shaft body 50 to the load member 43. Accordingly, the rotative driving force output from the electric motor 42 is converted to the translational driving force, which is then transmitted to the load member 43.

In this case, the driving force acting on the screw shaft body 50 from the nut 44 via the coil spring 51 of the screw shaft 45 corresponds to the amount of expansion/compression (amount of elastic deformation) of the coil spring 51. Specifically, when the amount of expansion/compression of the coil spring 51 (from its natural length condition) is denoted as DX, the driving force (translational driving force) acting on the screw shaft body 50 from the nut 44 via the coil spring 51 is denoted as PW, and a stiffness coefficient (so-called spring constant) representing sensitivity of the change in elastic force of the coil spring 51 to the change in expansion/compression amount DX of the coil spring 51 (i.e. the amount of change of the elastic force per unit change amount of DX) is denoted as Ke, then the relationship between DX and PW is expressed by the following expression (11).

$$PW = DX \times Ke \quad (11)$$

While PW, DX, and Ke are the reference characters used in the first embodiment as well, in the present embodiment, they are used for the above-described meanings.

Further, the expansion/compression amount DX of the coil spring 51 is of positive polarity in one of the compressing and expanding directions of the coil spring 51, and of negative polarity in the other direction. In the following, for convenience of explanation, it will be defined that the amount of expansion/compression in the compressing direction (i.e. the amount of compression) of the coil spring 51 is of positive polarity, and the amount of expansion/compression in the expanding direction (i.e. the amount of expansion) is of negative polarity. In this case, the positive direction of the driving force PW defined by the expression (11) corresponds to the left direction in FIG. 6.

As indicated by the expression (11), the driving force PW acting on the screw shaft body 50 from the nut 44 via the coil spring 51 is proportional to the expansion/compression amount DX of the coil spring 51. Further, the direction (polarity) of the driving force PW changes in accordance with the polarity of the expansion/compression amount DX.

Therefore, controlling the expansion/compression amount DX of the coil spring 51 makes it possible to control the driving force (translational driving force) PW transmitted from the nut 44 to the screw shaft body 50 via the coil spring 51 and, hence, the driving force transmitted from the electric motor 42 to the load member 43.

Further, in the state where the driving force PW transmitted from the nut 44 to the screw shaft body 50 via the coil spring 51 and the load acting on the screw shaft body 50 from the load member 43 side are balanced with each other, when the load applied varies, the coil spring 51 expands or compresses in accordance with the variation. Therefore, the kinetic energy of the load member 43 associated with the variation of the applied load is absorbed as it is converted to the elastic energy of the coil spring 51.

In order to control the driving force transmitted from the nut 44 to the screw shaft body 50 via the coil spring 51, the power transmission device 41 of the present embodiment includes a control device 61, which is made up of an electronic circuit unit including a CPU, a RAM, a ROM, and so on, a displacement sensor 62 for observing the amount of expansion/compression of the coil spring 51, and a speed sensor 63 for observing the rotational speed of the rotor (or the output shaft 42*a*) of the electric motor 42. The outputs (detection signals) from the displacement sensor 62 and the speed sensor 63 are input to the control device 61.

The speed sensor 63 is a rotary encoder, resolver, or other sensor mounted on the electric motor 42, as with the speed sensor 13 in the first embodiment, and it outputs a detection signal corresponding to the rotational speed (angular velocity) of the rotor of the electric motor 42.

The displacement sensor 62 in the present embodiment is a sensor which outputs a detection signal corresponding to the pitch of the teeth (adjacent to each other in the shaft center direction) of the coil spring 51 in its portion between the nut 44 and the aforesaid spring seat 53. For the displacement sensor 62, a known displacement sensor, such as an optical sensor or an eddy current sensor, for example, is used.

The expansion/compression amount DX of the coil spring 51 corresponds to the observed value of the above-described pitch which is indicated by the output of the displacement sensor 62. Therefore, it is possible to observe the actual amount of expansion/compression of the coil spring 51 from the output of the displacement sensor 62.

Supplementally, the displacement sensor 62 may be a sensor configured to output a signal corresponding to the distance (in the shaft center direction) between the nut 44 and the end of the coil spring 51 on the spring seat 53 side, for example. In this case, the amount of expansion/compression of the coil spring 51 corresponds to the above-described distance. It is thus possible to estimate the amount of expansion/compression of the coil spring 51 from the observed value of the distance.

The control device 61 includes, as a function implemented by an installed program or as a function implemented by a hardware configuration, a motor control section 65 which is responsible for operation control of the electric motor 42.

The motor control section 65 uses an observed value of the actual amount of expansion/compression of the coil spring 51, which is successively acquired on the basis of the output of the displacement sensor 62, and an observed value of the actual rotational speed of the rotor of the electric motor 42, which is successively acquired on the basis of the output of the speed sensor 63, to determine a control manipulated variable (control input) of the electric motor 42 successively, as will be described later. The control manipulated variable is a desired rotational angular acceleration of the rotor of the electric motor 42, as in the first embodiment. It should be noted that the control manipulated variable may be a desired torque of the electric motor 42, for example.

The motor control section 65 then controls the electric current flowing through the electric motor 42, in accordance with the determined control manipulated variable, to perform the operation control of the electric motor 42.

In this case, the operation control of the electric motor 42 is performed in such a way as to restrict the magnitude of the driving force (translational driving force) transmitted from the nut 44 to the screw shaft body 50 via the coil spring 51, or the temporal change rate of the driving force, to within a required range.

The control processing performed by the motor control section 65 will now be described in detail. In the following description, when an actual value or its observed value of an arbitrary state quantity is indicated using reference characters, the suffix "_act" is added to the reference characters, as in the first embodiment.

Referring to FIG. 2, the motor control section 65 of the present embodiment includes, as its functions, the functions identical to those of the motor control section 15 of the first embodiment. That is, as with the motor control section 15 of the first embodiment, the motor control section 65 includes: a basic motor acceleration determining section 21, an inter-element driving force calculating section 22, an inter-element driving force change rate calculating section 23, an allowable range setting section 24, an upper driving force limit setting section 25, a first motor acceleration correction amount calculating section 26, a second motor acceleration correction amount calculating section 27, and a desired motor acceleration calculating section 28.

In this case, in the present embodiment, the basic motor acceleration determining section 21 is a functional section which determines a basic motor acceleration $\omega dot\_base$ as a basic desired value of the rotational angular acceleration $\omega dot$ (motor acceleration $\omega dot$) of the rotor of the electric motor 42, the inter-element driving force calculating section 22 is a functional section which acquires an observed value of an actual value PW_act of an inter-element driving force PW, which is the driving force (translational driving force) transmitted from the nut 44 to the screw shaft body 50 via the coil spring 51, and the inter-element driving force change rate calculating section 23 is a functional section which acquires an observed value of an actual value PWdot_act of an inter-element driving force change rate PWdot, which is the temporal change rate (amount of change per unit time) of the inter-element driving force PW.

Further, the allowable range setting section 24 is a functional section which sets an inter-element driving force change rate allowable range as the allowable range for the inter-element driving force change rate PWdot, and the upper driving force limit setting section 25 is a functional section which sets an upper driving force limit PW_lim as the upper limit PW_lim of the magnitude (absolute value) of the inter-element driving force PW.

Further, the first motor acceleration correction amount calculating section 26 and the second motor acceleration correction amount calculating section 27 are functional sections which calculate a first motor acceleration correction amount $d\omega dot\_1$ and a second motor acceleration correction amount $d\omega dot\_2$, respectively, for correcting the basic motor acceleration $\omega dot\_base$, and the desired motor acceleration calculating section 28 is a functional section which performs arithmetic processing of correcting the basic motor acceleration $\omega dot\_base$ using the first motor acceleration correction amount $d\omega dot\_1$ and the second motor acceleration correction amount $d\omega dot\_2$.

The motor control section 65 of the present embodiment carries out the processing in the above-described functional sections, in a substantially similar manner as in the first embodiment. Thus, in the following, a description will be made focusing on the matters different from the first embodiment.

At each control processing cycle, the motor control section 65 first carries out the processing in the basic motor acceleration determining section 21, the inter-element driving force calculating section 22, the inter-element driving force change rate calculating section 23, the allowable range setting section 24, and the upper driving force limit setting section 25.

The basic motor acceleration determining section 21 successively receives a desired load driving force PWout_cmd, which is a desired value of the driving force (translational driving force) applied to the load member 43.

The desired load driving force PWout_cmd is determined successively in the control device 61 in accordance with the motional state of the load member 43 or the like, or it is supplied to the control device 61 from an external server or the like, as in the first embodiment. In the present embodiment, the desired load driving force PWout_cmd is also a desired value of the translational driving force of the screw shaft body 50.

Then, at each control processing cycle, the basic motor acceleration determining section 21 determines a basic motor acceleration $\omega dot\_base$ from the input desired load driving force PWout_cmd, in accordance with a preset map or arithmetic expression, as in the first embodiment.

It should be noted that the way of determining the basic motor acceleration $\omega dot\_base$ is not limited to the above-described technique; an arbitrary technique may be adopted.

For example, the basic motor acceleration $\omega dot\_base$ may be determined in the following manner. At each control processing cycle, the basic motor acceleration determining section 21 divides the current desired load driving force PWout_cmd (the desired translational driving force of the screw shaft body 50) by the stiffness coefficient Ke (which is a predetermined constant value) of the coil spring 51, to determine a desired expansion/compression amount DX_cmd as a desired value of the elastic deformation amount of the coil spring 51.

Further, the basic motor acceleration determining section 21 multiplies a deviation of the current actual expansion/compression amount DX_act (observed value) of the coil spring 51 from the desired expansion/compression amount DX_cmd thereof by a gain of a prescribed value (preset value), to determine a desired rotational speed $\omega\_cmd$ of the rotor of the electric motor 42.

The basic motor acceleration determining section 21 then multiplies a deviation of the current actual rotational speed $\omega\_act$ (observed value) of the rotor of the electric motor 42 from the desired rotational speed $\omega\_cmd$ of the rotor by a gain of a prescribed value (preset value), to thereby determine the basic motor acceleration ωdot_base.

Alternatively, the technique explained in U.S. Pat. No. 5,910,720, for example, may be used to determine the basic motor acceleration ωdot_base.

Next, the inter-element driving force calculating section 22 successively receives an observed value of the actual expansion/compression amount DX_act of the coil spring 51. At each control processing cycle, the inter-element driving force calculating section 22 determines the value of PW that is calculated from the aforesaid expression (11) with DX_act substituted for DX on the right side of the expression, as an inter-element driving force PW_act (observed value).

Next, as in the first embodiment, the inter-element driving force change rate calculating section 23 carries out, at each control processing cycle, a differential operation of calculating a temporal change rate of the inter-element driving force PW_act calculated by the inter-element driving force calculating section 22, to determine an inter-element driving force change rate PWdot_act (observed value).

It should be noted that, as in the first embodiment, after the temporal change rate of the inter-element driving force PW_act is calculated by the differential operation, the calculated value may be subjected to low-pass filtering, and the resultant value may be obtained as the inter-element driving force change rate PWdot_act (observed value).

Further, the inter-element driving force change rate PWdot_act may be calculated by multiplying a temporal change rate of the expansion/compression amount DX_act of the coil spring 51 (or the value obtained by subjecting this temporal change rate to low-pass filtering) by the stiffness coefficient Ke of the coil spring 51.

Next, the upper driving force limit setting section 25 successively receives an observed value of the actual rotational speed ω_act of the rotor of the electric motor 42. At each control processing cycle, the upper driving force limit setting section 25 determines an upper driving force limit PW_lim, in accordance with the processing identical to the processing described in the first embodiment (i.e. the processing described by referring to FIGS. 3 and 4).

In the present embodiment, however, the maximum allowable driving force PW_max which is determined as the upper driving force limit PW_lim in the case where the magnitude (absolute value) of the rotational speed ω_act (observed value) of the rotor of the electric motor 42 is not smaller than the prescribed value ωa (see FIG. 3) corresponding to ωdot_lim_a (or, in other words, when ωdot_lim≥ωdot_lim_a) is an elastic force which the coil spring 51 generates with a maximum amount of expansion/compression (amount of elastic deformation in the expanding or compressing direction) of the coil spring 51 that is allowable for maintaining the meshing state of the nut 44 and the coil spring 51 of the screw shaft 45 in an appropriate state (where power transmission between the nut 44 and the screw shaft 45 can be performed normally, with the force acting on the balls 46 between the nut 44 and the coil spring 51 of the screw shaft 45 being prevented from becoming excessively large).

Such a maximum allowable driving force PW_max is set in advance by design or through experiments, as in the first embodiment.

Supplementally, the upper driving force limit setting section 25 may determine the upper driving force limit PW_lim directly in accordance with the rotational speed ω_act (observed value) of the rotor of the electric motor 42 (without performing the processing of determining ωdot_lim), as in the case described in the first embodiment.

Further, the upper driving force limit PW_lim in the case where the inter-element driving force PW_act is of positive polarity and the upper driving force limit PW_lim in the case where the inter-element driving force PW_act is of negative polarity may be set to different values. The same applies to the maximum allowable driving force PW_max or to a maximum allowable expansion/compression amount DX_max which is the amount of expansion/compression of the coil spring 51 corresponding to the maximum allowable driving force PW_max.

Next, the aforesaid allowable range setting section 24 successively receives the inter-element driving force PW_act calculated by the inter-element driving force calculating section 22. At each control processing cycle, the allowable range setting section 24 sets an inter-element driving force change rate allowable range, so as to have the aforesaid characteristics 1 to 4, by the processing identical to the processing described in the first embodiment (i.e. the processing described by referring to FIG. 5).

In this case, however, the expansion/compression amount DX regarding the aforesaid characteristics 1 to 3 is the amount of expansion/compression of the coil spring 51 in the present embodiment.

At each control processing cycle, the motor control section 65 carries out the processing in the basic motor acceleration determining section 21, the inter-element driving force calculating section 22, the inter-element driving force change rate calculating section 23, the allowable range setting section 24, and the upper driving force limit setting section 25 in the above-described manner, and thereafter, the motor control section 65 carries out the processing in the first motor acceleration correction amount calculating section 26 and the second motor acceleration correction amount calculating section 27.

The processing in the first motor acceleration correction amount calculating section 26 and that in the second motor acceleration correction amount calculating section 27 are identical to those in the first embodiment.

The motor control section 65 next performs the same computation as in the first embodiment (the computation of the aforesaid expression (4)) by the desired motor acceleration calculating section 28, to thereby determine a desired motor acceleration ωdot_cmd.

Then, the motor control section 65 controls the electric current flowing through the electric motor 42, in accordance with the desired motor acceleration ωdot_cmd determined as described above. Specifically, the motor control section 65 multiplies the desired motor acceleration ωdot_cmd by a prescribed value corresponding to the inertia of the rotating system of the rotor of the electric motor 42, to determine a desired torque (i.e. a desired value of the output torque) of the electric motor 42. The motor control section 65 then determines a desired value of the electric current flowing through the electric motor 42, in accordance with the desired torque determined. Further, the motor control section 65 performs feedback control on the electric current to cause the electric current (observed value) actually flowing through the electric motor to converge to the desired value.

In this manner, the rotor of the electric motor 42 is controlled to rotate at the desired motor acceleration ωdot_cmd.

According to the embodiment described above, basically, the rotational amount of the rotor of the electric motor 42 is controlled such that the driving force actually applied to the load member 43 from the electric motor 42 side via the nut 44 and the screw shaft 45 tracks (converges to) the desired load driving force PWout_cmd.

When the load applied varies in this state, the coil spring 51 expands or compresses correspondingly, resulting in a variation in the inter-element driving force PW_act transmitted from the nut 44 to the screw shaft body 50 via the coil spring 51.

With such a variation in the inter-element driving force PW_act, when the magnitude (absolute value) of the inter-element driving force PW_act exceeds the upper driving force limit PW_lim set in the upper driving force limit setting section 25, the desired motor acceleration ωdot_cmd is corrected by the first motor acceleration correction amount dωdot_1 (≠0) calculated by the aforesaid first motor acceleration correction amount calculating section 26. Thus, the nut 44 is rotatively driven by the electric motor 42 in such a way as to decrease the magnitude of the expansion/compression amount DX_act (and, hence, the elastic force) of the coil spring 51.

As a result, the magnitude (absolute value) of the expansion/compression amount DX_act of the coil spring 51 is prevented from becoming larger than the expansion/compression amount DX_max corresponding to the aforesaid maximum allowable driving force PW_max. Consequently, the expansion/compression amount DX_act of the coil spring 51 is adjusted such that the force acting on the balls 46 between the nut 44 and the screw shaft 45 will not become excessively large.

Further, in the case where the rotational speed ω_act of the rotor of the electric motor 42 becomes higher than the aforesaid prescribed rotational speed ωa, the upper driving force limit PW_lim is set such that its magnitude becomes smaller than the maximum allowable driving force PW_max, as in the first embodiment. This restricts the desired motor acceleration ωdot_cmd such that the output torque of the electric motor 42 will not exceed the torque that can be actually achieved during high-speed rotation of the rotor. As a result, it is possible for the electric motor 42 to drive the nut 44 and the screw shaft 45 appropriately.

Further, if the load applied varies relatively quickly, the coil spring 51 attempts to expand or compress quickly in correspondence therewith. This leads to an increase in magnitude of the inter-element driving force change rate PWdot_act.

At this time, in the case where the inter-element driving force change rate PWdot_act falls outside the inter-element driving force change rate allowable range set in the aforesaid allowable range setting section 24 (i.e. when PWdot_act has become larger than PWdot_lim_p or when PWdot_act has become smaller than PWdot_lim_n), the desired motor acceleration ωdot_cmd is corrected by the second motor acceleration correction amount dωdot_2 (≠0) calculated by the aforesaid second motor acceleration correction amount calculating section 27, as in the first embodiment.

Thus, the nut 44 is rotatively driven by the electric motor 42 such that the magnitude of the inter-element driving force change rate PWdot_act and, hence, the magnitude of the temporal change rate of the expansion/compression amount DX_act of the coil spring 51 will not become excessively large.

Here, in the state where the screw shaft 45 is about to move in the shaft center direction relative to the nut 44, if the coil spring 51 attempts to expand or compress quickly in response to a quick variation in the applied load, there will be a sudden change in the pitch of the screw teeth of the screw shaft 45 at one end of the nut 44 (the end closer to the expanding/compressing portion of the coil spring 51 (which is the left end in FIG. 6)). Therefore, the meshing of the nut 44 and the screw shaft 45 at that end is likely to become inappropriate.

More specifically, the balls 46 between the nut 44 and the screw shaft 45 at the end of the nut 44 may be no longer able to roll smoothly, and consequently, the smooth relative movement of the nut 44 and the screw shaft 45 is liable to be impaired. Such an inconvenience is more likely to occur as the magnitude of the expansion/compression amount DX_act of the coil spring 51 is larger (as the inter-element driving force PW_act is larger).

In the present embodiment, however, the inter-element driving force change rate allowable range is set to have the aforesaid characteristic 1. Therefore, the magnitude of the inter-element driving force change rate PWdot_act and, hence, the magnitude of the temporal change rate of the expansion/compression amount DX_act of the coil spring 51 are restricted to be smaller as the magnitude of the inter-element driving force PW_act is larger.

Further, in the state where the coil spring 51 has been compressed or expanded to a certain extent (specifically, in the compressed state corresponding to the range of 0<PW_act<PWa or in the expanded state corresponding to the range of 0>PW_act>−PWa in FIG. 5), when the nut 44 is about to move relative to the screw shaft 45 in the shaft center direction, the meshing of the nut 44 and the screw shaft 45 is more likely to become inappropriate in the case where the load applied varies quickly in the direction of decreasing the magnitude of the expansion/compression amount DX_act of the coil spring 51, as compared to the case where the load applied varies quickly in the direction of further increasing the magnitude of the expansion/compression amount DX_act of the coil spring 51.

That is, in the case where the load applied varies quickly in the direction of decreasing the magnitude of the expansion/compression amount DX_act of the coil spring 51, in addition to a sudden change in the pitch of the screw teeth of the screw shaft 45 at the end of the nut 44 (at the end closer to the expansion/compression portion of the coil spring 51), there will be a sudden change in the direction of the force (translational force) acting on the balls 46 in the shaft center direction of the nut 44 and the screw shaft 45.

As such, as compared to the case where the load applied varies quickly in the direction of further increasing the magnitude of the expansion/compression amount DX_act of the coil spring 51, particularly, the smooth rolling of the balls 46 between the nut 44 and the screw shaft 45 at the end of the nut 44 is further more likely to be impaired. Therefore, the smooth relative movement of the nut 44 and the screw shaft 45 is liable to be impaired.

In the present embodiment, however, the inter-element driving force change rate allowable range is set to have the aforesaid characteristic 2. Therefore, in the state where the coil spring 51 has been compressed to a certain extent as described above, the absolute value of the lower limit PWdot_lim_n of the inter-element driving force change rate allowable range becomes smaller than the absolute value of the upper limit PWdot lim_p thereof.

Therefore, the magnitude of the inter-element driving force change rate PWdot_act and, hence, the magnitude of the temporal change rate of the expansion/compression amount DX_act of the coil spring 51 are restricted to be smaller in the case where the inter-element driving force change rate PWdot_act takes a value (<0) in the direction of decreasing the magnitude of the expansion/compression amount DX_act (>0) of the coil spring 51 (or, decreasing the magnitude of the inter-element driving force PW_act (>0)), as compared to the case where it takes a value (>0) in the direction of increasing the magnitude of the expansion/compression amount DX_act (>0) of the coil spring 51 (or, increasing the magnitude of the inter-element driving force PW_act (>0)).

Further, in the state where the coil spring 51 has been expanded to a certain extent as described above, the absolute value of the upper limit PWdot_lim_p of the inter-element driving force change rate allowable range becomes smaller than the absolute value of the lower limit PWdot_lim_n thereof, according to the aforesaid characteristic 2.

Therefore, the magnitude of the inter-element driving force change rate PWdot_act and, hence, the magnitude of the temporal change rate of the expansion/compression amount DX_act of the coil spring 51 are restricted to be smaller in the case where the inter-element driving force change rate PWdot_act takes a value (>0) in the direction of decreasing the magnitude of the expansion/compression amount DX_act (<0) of the coil spring 51 (or, decreasing the magnitude of the inter-element driving force PW_act (<0)), as compared to the case where it takes a value (<0) in the direction of increasing the magnitude of the expansion/compression amount DX_act (<0) of the coil spring 51 (or, increasing the magnitude of the inter-element driving force PW_act (<0)).

Furthermore, in the state where the magnitude (absolute value) of the expansion/compression amount DX_act of the coil spring 51 has become close to the aforesaid maximum allowable expansion/compression amount DX_max (specifically, in the compressed state corresponding to the range of PW_max≥PW_act>PWa or in the expanded state corresponding to the range of −PW_max≤PW_act<−PWa in FIG. 5), when the nut 44 is about to move relative to the screw shaft 45 in the shaft center direction, the meshing of the nut 44 and the screw shaft 45 is more likely to become inappropriate in the case where the load applied varies quickly in the direction of further increasing the magnitude of the expansion/compression amount DX_act of the coil spring 51, as compared to the case where the load applied varies quickly in the direction of decreasing the magnitude of the expansion/compression amount DX_act of the coil spring 51.

This is because the pitch of the screw teeth of the screw shaft 45 at the end of the nut 44 (at the end closer to the expansion/compression portion of the coil spring 51) is apt to change to a pitch close to, or greater than, the maximum allowable pitch corresponding to the maximum allowable expansion/compression amount DX_max of the coil spring 51. Accordingly, the smooth rolling of the balls 46 between the nut 44 and the screw shaft 45 at the end of the nut 44 is liable to be impaired.

In the present embodiment, however, the inter-element driving force change rate allowable range is set to have the aforesaid characteristic 3. Therefore, in the state where the coil spring 51 has been compressed by the amount of expansion/compression close to the maximum allowable expansion/compression amount DX_max as described above, the absolute value of the upper limit PWdot_lim_p of the inter-element driving force change rate allowable range becomes smaller than the absolute value of the lower limit PWdot_lim_n thereof.

Therefore, the magnitude of the inter-element driving force change rate PWdot_act and, hence, the magnitude of the temporal change rate of the expansion/compression amount DX_act of the coil spring 51 are restricted to be smaller in the case where the inter-element driving force change rate PWdot_act takes a value (>0) in the direction of increasing the magnitude of the expansion/compression amount DX_act (>0) of the coil spring 51 (or, increasing the magnitude of the inter-element driving force PW_act (>0)), as compared to the case where it takes a value (<0) in the direction of decreasing the magnitude of the expansion/compression amount DX_act (>0) of the coil spring 51 (or, decreasing the magnitude of the inter-element driving force PW_act (>0)).

Further, in the state where the coil spring 51 has been expanded by the amount of expansion/compression close to the maximum allowable expansion/compression amount DX_max as described above, the absolute value of the lower limit PWdot_lim_n of the inter-element driving force change rate allowable range becomes smaller than the absolute value of the upper limit PWdot_lim_p thereof.

Therefore, the magnitude of the inter-element driving force change rate PWdot_act and, hence, the magnitude of the temporal change rate of the expansion/compression amount DX_act of the coil spring 51 are restricted to be smaller in the case where the inter-element driving force change rate PWdot_act takes a value (<0) in the direction of increasing the magnitude of the expansion/compression amount DX_act (<0) of the coil spring 51 (or, increasing the magnitude of the inter-element driving force PW_act (<0)), as compared to the case where it takes a value (>0) in the direction of decreasing the magnitude of the expansion/compression amount DX_act (<0) of the coil spring 51 (or, decreasing the magnitude of the inter-element driving force PW_act (<0)).

Furthermore, the inter-element driving force change rate allowable range is set to have the aforesaid characteristic 4. Therefore, in the state where the magnitude of the expansion/compression amount DX_act of the coil spring 51 has reached the maximum allowable expansion/compression amount DX_max, the inter-element driving force change rate PWdot_act is restricted so as not to take a value in the direction of further increasing the expansion/compression amount DX_act (i.e. a value of the same direction (polarity) as PW_act).

In the above-described manner, the inter-element driving force change rate PWdot_act is restricted in such a way as to prevent it from falling outside the inter-element driving force change rate allowable range that is set in accordance with the inter-element driving force PW_act. Accordingly, the temporal change rate of the expansion/compression amount DX_act of the coil spring 51 is adjusted to prevent the smooth rolling of the balls 46 between the nut 44 and the screw shaft 45 from being impaired.

Therefore, according to the power transmission device 41 of the present embodiment, it is possible to transmit power from the electric motor 42 to the load member 43, while maintaining the meshing of the nut 44 and the screw shaft 45 in an appropriate state.

It should be noted that, in the present embodiment, the end (in FIG. 6, the right end) of the coil spring 51 on the side opposite to the spring seat 53 side remains free. Alternatively, the end may be fixedly secured to the screw shaft body 50.

This configuration causes the two portions of the coil spring 51 protruding from the nut 44 on the spring seat 53 side and on the other side, respectively, to expand or compress in the directions opposite to each other.

In this case, the amount of expansion/compression of the portion of the coil spring 51 protruding from the nut 44 on the spring seat 53 side and that of the portion protruding from the nut 44 on the other side of the spring seat 53 can be observed, for example, by measuring the pitches of the screw teeth of the coil spring 51 in the respective portions, using appropriate displacement sensors. Consequently, the driving force (inter-element driving force) acting on the screw shaft body 50 from the nut 44 via the coil spring 51 can be observed in accordance with the observed amounts of expansion/compression of the coil spring 51.

Third Embodiment

A third embodiment of the present invention will now be described with reference to FIGS. 7 and 2. It should be noted that the configuration of a power transmission device 71 of the present embodiment is identical to that of the power transmission device 41 of the second embodiment except for a part thereof. Therefore, in the present embodiment, the same components as in the second embodiment are denoted by the same reference characters as in the second embodiment, and the detailed description thereof will not be repeated.

Figure 7:
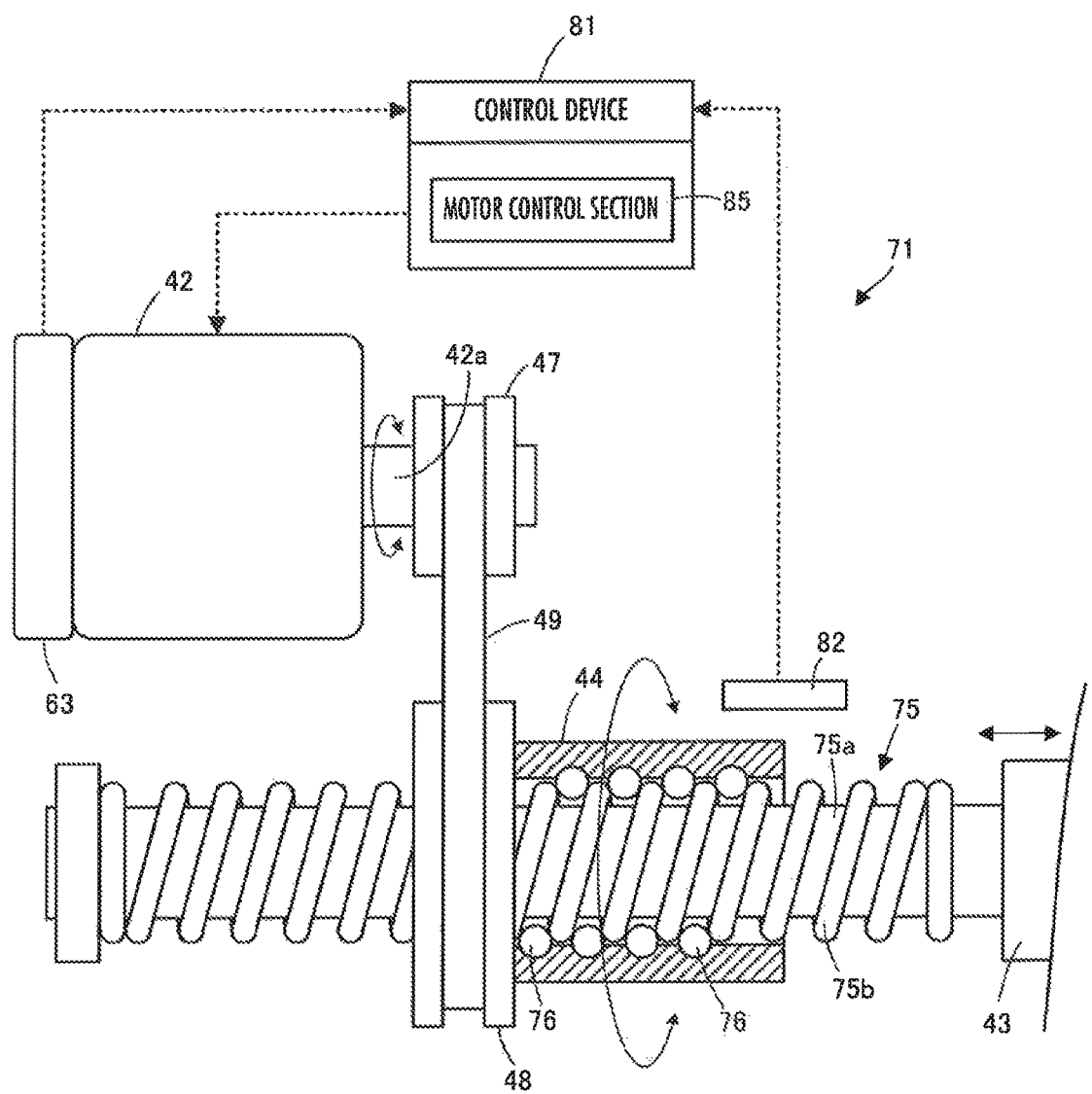
FIG. 7 shows the configuration of a power transmission device of a third embodiment of the present invention.

Referring to FIG. 7, the power transmission device 71 according the present embodiment includes, on a power transmission path between an electric motor 42 as an actuator and a load member 43, a nut 44 and a screw shaft 75 constituting a ball screw mechanism, the nut 44 and the screw shaft 75 serving as a driving element and a driven element having meshing portions that mesh with each other.

In the present embodiment, however, the screw shaft 75 has screw teeth 75b formed unitarily with a rod-shaped screw shaft body 75a, on the outer peripheral surface of the screw shaft body 75a.

In the present embodiment, a plurality of balls 76 fitted into the tooth grooves of the nut 44 and the tooth grooves of the screw shaft 75 inside the nut 44 are each made up of an elastic member. Hereinafter, the balls 76 will be referred to as the elastic balls 76.

The mechanical structure of the power transmission device 71 of the present embodiment is identical to that of the first embodiment except for the above-described matters.

In the power transmission device 71 configured as described above, when the electric motor 42 is started (to generate an output torque), a rotative driving force is applied to the nut 44. As a result, the screw shaft 75 attempts to move (linearly) in the shaft center direction.

At this time, each elastic ball 76 between the nut 44 and the screw shaft 75 is compressed in accordance with the load (translational force in the shaft center direction of the screw shaft 75) which acts on the screw shaft 75 from the load member 43 side. As a result, the driving force (translational driving force) is transmitted elastically from the nut 44 to the screw shaft 75 via the elastic balls 76. The driving force is further transmitted from the screw shaft 75 to the load member 43. Accordingly, the rotative driving force output from the electric motor 42 is converted to the translational driving force, which is then transmitted to the load member 43.

In this case, with the compression (elastic deformation) of all the elastic balls 76 interposed between the nut 44 and the screw shaft 75 inside the nut 44, the screw shaft 75 is displaced relative to the nut 44 in the shaft center direction. Hereinafter, the amount of such relative displacement will be referred to as "spring-like displacement amount".

The driving force acting on the screw shaft 75 from the nut 44 via the elastic balls 76 is approximately proportional to the spring-like displacement amount described above. Specifically, when the spring-like displacement amount of the screw shaft 75 with respect to the nut 44 is denoted as DX, the driving force (translational driving force) acting on the screw shaft 75 from the nut 44 via the elastic balls 76 is denoted as PW, and a stiffness coefficient (so-called spring constant) representing sensitivity of the change in elastic force to the change in spring-like displacement amount DX corresponding to the change in compression amount of the elastic balls 76 (i.e. the amount of change of the elastic force per unit change amount of DX) is denoted as Ke, then the relationship between DX and PW is expressed by the following expression (12).

$$PW = -DX \times Ke \qquad (12)$$

While PW, DX, and Ke are the reference characters used in the first or second embodiment as well, in the present embodiment, they are used for the above-described meanings. In this case, PW corresponds to an overall elastic force (in the shaft center direction of the screw shaft 75) which is generated by compression (elastic deformation) of all the elastic balls 76 interposed between the nut 44 and the screw shaft 75 inside the nut 44, and Ke corresponds to an overall stiffness coefficient of all the elastic balls 76.

As for the polarity of the spring-like displacement amount DX of the screw shaft 75 with respect to the nut 44, the displacement amount to one side (to the left or to the right in FIG. 7) in the shaft center direction of the screw shaft 75 is of positive polarity, and the displacement amount to the other side is of negative polarity. In the following, for convenience of explanation, it will be defined that the spring-like displacement amount DX and the driving force PW to the right in FIG. 7 are of positive polarity, and the spring-like displacement amount DX to the left is of negative polarity. In this case, the positive direction of the driving force PW defined by the expression (12) corresponds to the left direction in FIG. 7.

As described above, the driving force PW acting on the screw shaft 75 from the nut 44 via the elastic balls 76 is approximately proportional to the spring-like displacement amount DX of the screw shaft 75 with respect to the nut 44.

Therefore, controlling the spring-like displacement amount DX described above makes it possible to control the driving force (translational driving force) PW transmitted from the nut 44 to the screw shaft 75 via the elastic balls 76 and, hence, the driving force transmitted from the electric motor 42 to the load member 43.

Further, in the state where the driving force PW transmitted from the nut 44 to the screw shaft 75 via the elastic balls 76 and the load acting on the screw shaft 75 from the load member 43 side are balanced with each other, when the load applied varies, the amount of compression of the elastic balls 76 changes in accordance with the variation. Therefore, the kinetic energy of the load member 43 associated with the variation of the applied load is absorbed as it is converted to the elastic energy of the elastic balls 76.

In order to control the driving force transmitted from the nut 44 to the screw shaft 75, the power transmission device 71 of the present embodiment includes a control device 81 and a speed sensor 63, as in the second embodiment, and also includes a displacement sensor 82 for observing the spring-like displacement amount DX of the screw shaft 75. The output (detection signal) of the displacement sensor 82 is input to the control device 81, together with the output of the speed sensor 63.

The displacement sensor 82 in the present embodiment is a sensor which outputs a detection signal corresponding to the relative displacement amount of the screw shaft 75 with respect to the nut 44 (the relative displacement amount in the shaft center direction of the screw shaft 75). For the displacement sensor 82, a known displacement sensor, such as an optical sensor or an eddy current sensor, for example, is used.

Here, in the state where no elastic deformation of the elastic balls 76 has occurred, the relative displacement amount (hereinafter, this will be referred to as "basic relative displacement amount") of the screw shaft 75 with respect to the nut 44 is defined in accordance with the rotational amount (angle of rotation from the reference rotational angle position) of the nut 44. The rotational amount of the nut 44 can be estimated from: the rotational angle (observed value) of the rotor of the electric motor 42, which is recognized from the output of the speed sensor 63 configured with a rotary encoder or the like; and the speed reduction ratio from the electric motor 42 to the nut 44 (in the present embodiment, the reduction ratio of the belt and pulley power transmission mechanism).

Further, the relative displacement amount of the screw shaft 75, recognized from the output of the displacement sensor 82, is a combined displacement amount of the above-described basic relative displacement amount and the aforesaid spring-like displacement amount DX. Therefore, the spring-like displacement amount DX is obtained by subtracting the basic relative displacement amount from the combined displacement amount.

It is therefore possible to obtain the observed value of the spring-like displacement amount DX from: the relative displacement amount (observed value) of the screw shaft 75, recognized from the output of the displacement sensor 82; the rotational angle (observed value) of the rotor of the electric motor 42, recognized from the output of the speed sensor 63; and the value (which is a constant value in the present embodiment) of the speed reduction ratio from the electric motor 42 to the nut 44.

It should be noted that a sensor such as a rotary encoder for directly observing the rotational amount of the nut 44 may be provided separately from the speed sensor 63. In this case, the observed value of the spring-like displacement amount DX can be obtained from: the rotational amount (observed value) of the nut 44, recognized from the output of this sensor; and the relative displacement amount (observed value) of the screw shaft 75, recognized from the output of the displacement sensor 82.

The control device 81 includes, as a function implemented by an installed program or as a function implemented by a hardware configuration, a motor control section 85 which is responsible for operation control of the electric motor 42.

The motor control section 85 uses an observed value of the actual relative displacement amount of the screw shaft 75 and an observed value of the actual rotational speed of the rotor of the electric motor 42, to determine a control manipulated variable of the electric motor 42 successively, as will be described later. The control manipulated variable is a desired rotational angular acceleration (or a desired torque) of the rotor of the electric motor 42, as in the second embodiment.

The motor control section 85 then controls the electric current flowing through the electric motor 42, in accordance with the determined control manipulated variable, to thereby perform the operation control of the electric motor 42.

In this case, the operation control of the electric motor 42 is performed in such a way as to restrict the magnitude of the driving force (translational driving force) transmitted from the nut 44 to the screw shaft 75 via the elastic balls 76, or the temporal change rate of the driving force, to be within a required range.

The control processing performed by the motor control section 85 will now be described in detail. In the following description, when an actual value or its observed value of an arbitrary state quantity is indicated using reference characters, the suffix "_act" is added to the reference characters, as in the first or second embodiment.

Referring to FIG. 2, the motor control section 85 of the present embodiment includes, as its functions, the functions identical to those of the motor control section 15 or 65 of the first or second embodiment. That is, the motor control section 85 includes: a basic motor acceleration determining section 21, an inter-element driving force calculating section 22, an inter-element driving force change rate calculating section 23, an allowable range setting section 24, an upper driving force limit setting section 25, a first motor acceleration correction amount calculating section 26, a second motor acceleration correction amount calculating section 27, and a desired motor acceleration calculating section 28.

The motor control section 85 carries out the processing in the above-described functional sections, in a similar manner as in the second embodiment.

Specifically, at each control processing cycle, the motor control section 85 first carries out the processing in the basic motor acceleration determining section 21, the inter-element driving force calculating section 22, the inter-element driving force change rate calculating section 23, the allowable range setting section 24, and the upper driving force limit setting section 25.

The basic motor acceleration determining section 21 successively receives a desired load driving force PWout_cmd, which is a desired value of the driving force (translational driving force) applied to the load member 43.

The desired load driving force PWout_cmd is determined successively in the control device 81 in accordance with the motional state of the load member 43 or the like, or it is supplied to the control device 81 from an external server or the like, as in the first embodiment. In the present embodiment, the desired load driving force PWout_cmd is also a desired value of the translational driving force of the screw shaft 75.

Then, at each control processing cycle, the basic motor acceleration determining section 21 determines a basic motor acceleration $\omega$dot_base from the input desired load driving force PWout_cmd, in accordance with a preset map or arithmetic expression, as in the first embodiment.

It should be noted that the way of determining the basic motor acceleration $\omega$dot_base is not limited to the above-described technique; an arbitrary technique may be adopted.

For example, the basic motor acceleration $\omega$dot_base may be determined in the following manner. At each control processing cycle, the basic motor acceleration determining section 21 divides the current desired load driving force PWout_cmd (the desired translational driving force of the screw shaft 75) by the stiffness coefficient Ke (which is a predetermined constant value) corresponding to the overall stiffness coefficient of the elastic balls 76 interposed between the nut 44 and the screw shaft 75, to determine a desired spring-like displacement amount DX_cmd as a desired value of the spring-like displacement amount DX.

Further, the basic motor acceleration determining section 21 multiplies a deviation of the current actual spring-like displacement amount DX_act (observed value) from the desired spring-like displacement amount DX_cmd by a gain of a prescribed value (preset value), to determine a desired rotational speed $\omega$_cmd of the rotor of the electric motor 42.

The basic motor acceleration determining section 21 then multiplies a deviation of the current actual rotational speed ω_act (observed value) of the rotor of the electric motor 42 from the desired rotational speed ω_cmd of the rotor by a gain of a prescribed value (preset value), to thereby determine the basic motor acceleration ωdot_base.

Alternatively, the technique explained in U.S. Pat. No. 5,910,720, for example, may be used to determine the basic motor acceleration ωdot_base.

Next, the inter-element driving force calculating section 22 successively receives an observed value of the actual spring-like displacement amount DX_act of the screw shaft 75. At each control processing cycle, the inter-element driving force calculating section 22 determines the value of PW that is calculated from the aforesaid expression (12) with DX_act substituted for DX on the right side of the expression, as an inter-element driving force PW_act (observed value).

Next, the inter-element driving force change rate calculating section 23 calculates an inter-element driving force change rate PWdot_act (observed value) by the processing identical to that in the first embodiment (by the differential operation of calculating the temporal change rate of the inter-element driving force PW_act).

It should be noted that, after the temporal change rate of the inter-element driving force PW_act is calculated by the differential operation, the calculated value may be subjected to low-pass filtering, and the resultant value may be obtained as the inter-element driving force change rate PWdot_act (observed value).

Further, the inter-element driving force change rate PWdot_act may be calculated by multiplying the temporal change rate of the spring-like displacement amount DX_act of the screw shaft 75 (or the value obtained by subjecting this temporal change rate to low-pass filtering) by the stiffness coefficient Ke.

Next, the upper driving force limit setting section 25 successively receives an observed value of the actual rotational speed ω_act of the rotor of the electric motor 42. At each control processing cycle, the upper driving force limit setting section 25 determines an upper driving force limit PW_lim, in accordance with the processing identical to the processing described in the first embodiment (i.e. the processing described by referring to FIGS. 3 and 4).

In the present embodiment, however, the maximum allowable driving force PW_max which is determined as the upper driving force limit PW_lim in the case where the magnitude (absolute value) of the rotational speed ω_act (observed value) of the rotor of the electric motor 42 is not smaller than the prescribed value ωa (see FIG. 3) corresponding to ωdot_lim_a (or, in other words, when ωdot_limωdot_lim_a) is a maximum spring-like displacement amount that is allowable for maintaining the meshing state of the nut 44 and the screw shaft 75 in an appropriate state (where power transmission between the nut 44 and the screw shaft 75 can be performed normally, with the force acting on the elastic balls 76 between the nut 44 and the screw shaft 75 being prevented from becoming excessively large (with the elastic balls 76 being not compressed excessively)).

Such a maximum allowable driving force PW_max is set in advance by design or through experiments, as in the first embodiment.

Supplementally, the upper driving force limit setting section 25 may determine the upper driving force limit PW_lim directly in accordance with the rotational speed ω_act (observed value) of the rotor of the electric motor 42 (without performing the processing of determining ωdot_lim).

Further, the upper driving force limit PW_lim in the case where the inter-element driving force PW_act is of positive polarity and the upper driving force limit PW_lim in the case where the inter-element driving force PW_act is of negative polarity may be set to different values. The same applies to the maximum allowable driving force PW_max or to a maximum allowable spring-like displacement amount DX_max which is the spring-like displacement amount DX corresponding to the maximum allowable driving force PW_max.

Next, the aforesaid allowable range setting section 24 successively receives the inter-element driving force PW_act calculated by the inter-element driving force calculating section 22. At each control processing cycle, the allowable range setting section 24 sets an inter-element driving force change rate allowable range, so as to have the aforesaid characteristics 1 to 4, by the processing identical to the processing described in the first embodiment (i.e. the processing described by referring to FIG. 5).

In this case, however, the expansion/compression amount DX regarding the aforesaid characteristics 1 to 3 is the spring-like displacement amount of the screw shaft 75 with respect to the nut 44 in the present embodiment.

At each control processing cycle, the motor control section 85 carries out the processing in the basic motor acceleration determining section 21, the inter-element driving force calculating section 22, the inter-element driving force change rate calculating section 23, the allowable range setting section 24, and the upper driving force limit setting section 25 in the above-described manner, and thereafter, the motor control section 85 carries out the processing in the first motor acceleration correction amount calculating section 26 and the second motor acceleration correction amount calculating section 27.

The processing in the first motor acceleration correction amount calculating section 26 and that in the second motor acceleration correction amount calculating section 27 are identical to those in the first or second embodiment.

The motor control section 85 next performs the same computation as in the first embodiment (the computation of the aforesaid expression (4)) by the desired motor acceleration calculating section 28, to thereby determine a desired motor acceleration ωdot_cmd.

Then, the motor control section 85 controls the electric current flowing through the electric motor 42, in accordance with the desired motor acceleration ωdot_cmd determined as described above. Specifically, the motor control section 85 multiplies the desired motor acceleration ωdot_cmd by a prescribed value corresponding to the inertia of the rotating system of the rotor of the electric motor 42, to determine a desired torque (i.e. a desired value of the output torque) of the electric motor 42. The motor control section 85 then determines a desired value of the electric current flowing through the electric motor 42, in accordance with the desired torque determined. Further, the motor control section 85 performs feedback control on the electric current to cause the electric current (observed value) actually flowing through the electric motor to converge to the desired value.

In this manner, the rotor of the electric motor 42 is controlled to rotate at the desired motor acceleration ωdot_cmd.

According to the embodiment described above, basically, the rotational amount of the rotor of the electric motor 42 is controlled such that the driving force actually applied to the load member 43 from the electric motor 42 side via the nut 44 and the screw shaft 75 tracks (converges to) the desired load driving force PWout_cmd.

When the load applied varies in this state, the spring-like displacement amount DX_act changes because of the corresponding compression of the elastic balls 76, resulting in a variation in the inter-element driving force PW_act transmitted from the nut 44 to the screw shaft 75 via the elastic balls 76.

With such a variation in the inter-element driving force PW_act, when the magnitude (absolute value) of the inter-element driving force PW_act exceeds the upper driving force limit PW_lim set in the upper driving force limit setting section 25, the desired motor acceleration ωdot_cmd is corrected by the first motor acceleration correction amount dωdot_1 (≠0) calculated by the aforesaid first motor acceleration correction amount calculating section 26. Thus, the nut 44 is rotatively driven by the electric motor 42 in such a way as to decrease the magnitude of the spring-like displacement amount DX_act (and, hence, the amount of compression of the elastic balls 76).

As a result, the magnitude (absolute value) of the spring-like displacement amount DX_act is prevented from becoming larger than the maximum allowable spring-like displacement amount DX_max corresponding to the aforesaid maximum allowable driving force PW_max. Consequently, the spring-like displacement amount DX_act between the nut 44 and the screw shaft 75 is adjusted such that the elastic balls 76 will not be compressed excessively between the nut 44 and the screw shaft 75.

Further, in the case where the rotational speed ω_act of the rotor of the electric motor 42 becomes higher than the aforesaid prescribed rotational speed ωa, the upper driving force limit PW_lim is set such that its magnitude becomes smaller than the maximum allowable driving force PW_max, as in the first embodiment. This restricts the desired motor acceleration ωdot_cmd such that the output torque of the electric motor 42 will not exceed the torque that can be actually achieved during high-speed rotation of the rotor. As a result, it is possible for the electric motor 42 to drive the nut 44 and the screw shaft 75 appropriately.

Further, if the load applied varies relatively quickly, the amount of compression of the elastic balls 76 and, hence, the spring-like displacement amount DX_act are apt to change quickly in correspondence therewith. This leads to an increase in magnitude of the inter-element driving force change rate PWdot_act.

At this time, in the case where the inter-element driving force change rate PWdot_act falls outside the inter-element driving force change rate allowable range set in the aforesaid allowable range setting section 24 (i.e. when PWdot_act has become larger than PWdot_lim_p or when PWdot_act has become smaller than PWdot_lim_n), the desired motor acceleration ωdot_cmd is corrected by the second motor acceleration correction amount dωdot_2 (≠0) calculated by the aforesaid second motor acceleration correction amount calculating section 27, as in the first embodiment.

Thus, the nut 44 is rotatively driven by the electric motor 42 such that the magnitude of the inter-element driving force change rate PWdot_act and, hence, the magnitude of the temporal change rate of the spring-like displacement amount DX_act will not become excessively large.

Here, in the state where the screw shaft 75 is about to move in the shaft center direction relative to the nut 44, if the amount of compression of the elastic balls 76 is about to change quickly in response to a quick variation in the applied load, there will be a sudden change in shape of the elastic balls 76 interposed between the nut 44 and the screw shaft 75, and there will also be a sudden change in clearance between the elastic balls 76 and the screw teeth of the screw shaft 75 or the nut 44. Accordingly, the meshing of the nut 44 and the screw shaft 75 is likely to become inappropriate.

More specifically, the elastic balls 76 may be no longer able to roll smoothly, and consequently, the smooth relative movement of the nut 44 and the screw shaft 75 is liable to be impaired. Such an inconvenience is more likely to occur as the magnitude of the spring-like displacement amount DX_act between the nut 44 and the screw shaft 75 is larger (as the inter-element driving force PW_act is larger).

In the present embodiment, however, the inter-element driving force change rate allowable range is set to have the aforesaid characteristic 1. Therefore, the magnitude of the inter-element driving force change rate PWdot_act and, hence, the magnitude of the temporal change rate of the spring-like displacement amount DX_act are restricted to be smaller as the magnitude of the inter-element driving force PW_act is larger.

Further, in the state where the elastic balls 76 interposed between the nut 44 and the screw shaft 75 have been compressed to a certain extent (specifically, in the compressed state corresponding to the range of 0<PW_act<PWa or the range of 0>PW_act>−PWa in FIG. 5), when the nut 44 is about to move relative to the screw shaft 75 in the shaft center direction, the meshing of the nut 44 and the screw shaft 75 is more likely to become inappropriate in the case where the load applied varies quickly in the direction of decreasing the magnitude of the spring-like displacement amount DX_act, as compared to the case where the load applied varies quickly in the direction of further increasing the magnitude of the spring-like displacement amount DX_act.

That is, in the case where the load applied varies quickly in the direction of decreasing the magnitude of the spring-like displacement amount DX_act between the nut 44 and the screw shaft 75, in addition to a sudden change in amount of deformation of the elastic balls 76 interposed between the nut 44 and the screw shaft 75, there will be a sudden change in the direction of the force (translational force) acting on the elastic balls 76. As such, as compared to the case where the load applied varies quickly in the direction of further increasing the magnitude of the spring-like displacement amount DX_act, the smooth rolling of the elastic balls 76 between the nut 44 and the screw shaft 75 is further more likely to be impaired. Therefore, the smooth relative movement of the nut 44 and the screw shaft 75 is liable to be impaired.

In the present embodiment, however, the inter-element driving force change rate allowable range is set to have the aforesaid characteristic 2.

Therefore, in the state where the elastic balls 76 have been compressed to a certain extent such that the spring-like displacement amount DX_act takes a positive value, the magnitude of the inter-element driving force change rate PWdot_act and, hence, the magnitude of the temporal change rate of the spring-like displacement amount DX_act are restricted to be smaller in the case where the inter-element driving force change rate PWdot_act takes a value (<0) in the direction of decreasing the magnitude of the spring-like displacement amount DX_act (>0) (or, decreasing the magnitude of the inter-element driving force PW_act (>0)), as compared to the case where it takes a value (>0) in the direction of increasing the magnitude of the spring-like displacement amount DX_act (>0) (or, increasing the magnitude of the inter-element driving force PW_act (>0)).

Further, in the state where the elastic balls 76 have been compressed to a certain extent such that the spring-like displacement amount DX_act takes a negative value, the magnitude of the inter-element driving force change rate PWdot_act and, hence, the magnitude of the temporal change rate of the spring-like displacement amount DX_act are restricted to be smaller in the case where the inter-element driving force change rate PWdot_act takes a value (>0) in the direction of decreasing the magnitude of the spring-like displacement amount DX_act (<0) (or, decreasing the magnitude of the inter-element driving force PW_act (<0)), as compared to the case where it takes a value (<0) in the direction of increasing the magnitude of the spring-like displacement amount DX_act (<0) (or, increasing the magnitude of the inter-element driving force PW_act (<0)).

Furthermore, in the state where the magnitude (absolute value) of the spring-like displacement amount DX_act has become close to the aforesaid maximum allowable spring-like displacement amount DX_max (specifically, in the compressed state of the elastic balls 76 corresponding to the range of PW_max≥PW_act>PWa or the range of −PW_max≤PW_act<−PWa in FIG. 5), when the nut 44 is about to move relative to the screw shaft 75 in the shaft center direction, the meshing of the nut 44 and the screw shaft 75 is more likely to become inappropriate in the case where the load applied varies quickly in the direction of further increasing the magnitude of the spring-like displacement amount DX_act, as compared to the case where the load applied varies quickly in the direction of decreasing the magnitude of the spring-like displacement amount DX_act.

This is because the amount of compression of the elastic balls 76 interposed between the nut 44 and the screw shaft 75 is apt to change to the amount close to, or greater than, the maximum allowable compression amount corresponding to the maximum allowable spring-like displacement amount DX_max, and therefore, the smooth rolling of the elastic balls 76 is liable to be impaired.

In the present embodiment, however, the inter-element driving force change rate allowable range is set to have the aforesaid characteristic 3.

Therefore, the magnitude of the inter-element driving force change rate PWdot_act and, hence, the magnitude of the temporal change rate of the spring-like displacement amount DX_act are restricted to be smaller in the case where the inter-element driving force change rate PWdot_act takes a value in the direction of increasing the amount of compression of the elastic balls 76, as compared to the case where it takes a value in the direction of decreasing the amount of compression of the elastic balls 76.

Furthermore, the inter-element driving force change rate allowable range is set to have the aforesaid characteristic 4. Therefore, in the state where the magnitude of the spring-like displacement amount DX_act has reached the maximum allowable spring-like displacement amount DX_max, the inter-element driving force change rate PWdot_act is restricted so as not to take a value in the direction of further increasing the spring-like displacement amount DX_act (i.e. a value of the same direction (polarity) as PW_act).

In the above-described manner, the inter-element driving force change rate PWdot_act is restricted in such a way as to prevent it from falling outside the inter-element driving force change rate allowable range that is set in accordance with the inter-element driving force PW_act. Accordingly, the temporal change rate of the spring-like displacement amount DX_act is adjusted to prevent the smooth rolling of the elastic balls 76 between the nut 44 and the screw shaft 75 from being impaired.

Therefore, according to the power transmission device 71 of the present embodiment, it is possible to transmit power from the electric motor 42 to the load member 43, while maintaining the meshing of the nut 44 and the screw shaft 75 in an appropriate state.

Fourth Embodiment

A fourth embodiment of the present invention will now be described with reference to FIGS. 8 and 2. In the present embodiment, the functional configuration of the motor control section is identical to that of the first embodiment, and therefore, FIG. 2 is used as the block diagram for explanation thereof.

Figure 8A:
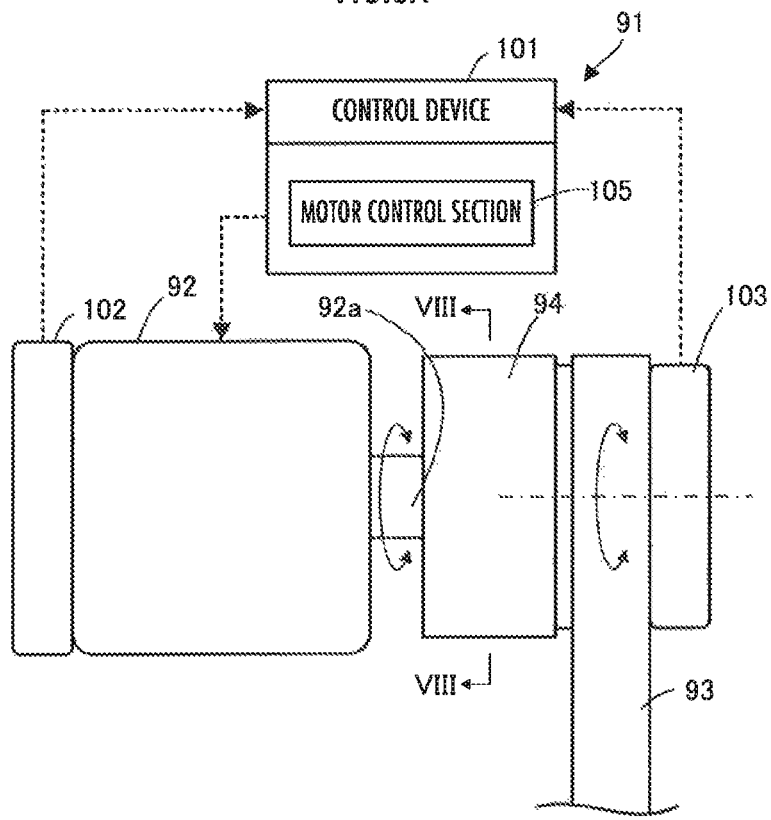
FIG. 8A and FIG. 8B show the configuration of a power transmission device of a fourth embodiment of the present invention.

Referring to FIG. 8A, a power transmission device 91 according the present embodiment includes a wave gear device 94 on a power transmission path between an actuator 92 and a load member 93, and the power transmission device 91 transmits the driving force output from the actuator 92 to the load member 93 via the wave gear device 94.

The actuator 92 is an electric motor as a rotary actuator, as in the aforesaid first embodiment and others. Hereinafter, the actuator 92 will be referred to as the electric motor 92. This electric motor 92 has an output shaft 92a which is rotatable unitarily with a rotor (not shown) of the motor, as in the first embodiment. The rotor or the output shaft 92a of the electric motor 92 corresponds to the output section of the electric motor in the present invention.

Figure 8B:
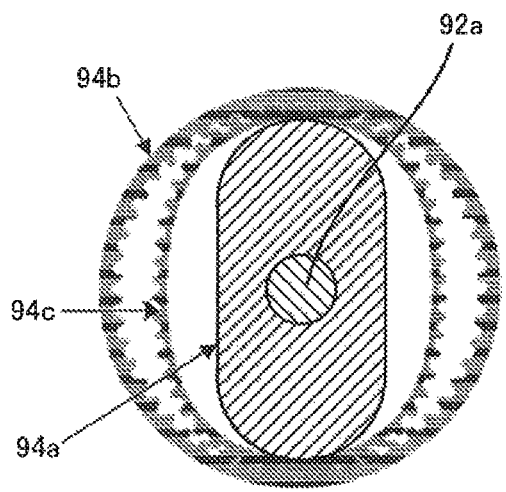

The wave gear device 94 is of a known structure which has, as its basic components, a wave generator 94a, a circular spline 94b, and a flex spline 94c, as shown in FIG. 8B.

The flex spline 94c is formed of an elastic member and has a ring shape, with teeth and tooth grooves formed on its outer periphery. This flex spline 94c is configured such that it is deformed into an elliptical shape by the wave generator 94a which is disposed inside the flex spline 94c. The flex spline 94c is further configured such that its major axis rotates along with the rotation of the wave generator 94a.

With the circular spline 94b having internal teeth being disposed on the outside of the flex spline 94c coaxially with the wave generator 94a, the flex spline 94c and the circular spline 94b are meshed with each other at respective ends in the major axis direction of the flex spline 94c.

In the present embodiment, the flex spline 94c and the circular spline 94b which are meshed with each other in the above-described manner correspond to the driving element and the driven element, respectively, of the present invention.

In the wave gear device 94 configured as described above, when the wave generator 94a is rotatively driven, the major axis of the flex spline 94c rotates. Correspondingly, the circular spline 94b rotates, at a lower speed than the wave generator 94a, with the teeth engagement position between the flex spline 94c as the driving element and the circular spline 94b as the driven element moving by turns.

This causes the driving force (rotative driving force) to be transmitted from the wave generator 94a to the circular spline 94b via the flex spline 94c.

In the present embodiment, the wave generator 94a is connected to the output shaft 92a of the electric motor 92 such that the wave generator 94a rotates unitarily with the output shaft 92a.

Further, the load member 93 is connected to the circular spline 94b such that the load member 93 rotates unitarily with the circular spline 94b. The load member 93 may be an arbitrary structure or mechanism.

The above has described the mechanical structure of the power transmission device 91 of the present embodiment.

In the power transmission device 91 configured as described above, when the electric motor 92 is started (to generate an output torque), a rotative driving force is applied to the wave generator 94a of the wave gear device 94, and this rotative driving force is transmitted via the flex spline 94c and the circular spline 94b to the load member 93.

At this time, although the flex spline 94c is maintained in an approximately elliptical shape, the deformed shape of the flex spline 94c slightly changes in accordance with the load (load torque) which acts on the circular spline 94b from the load member 93 side. With this change in the deformed shape of the flex spline 94c, the number of teeth engaged between the flex spline 94c and the circular spline 94b changes, and accordingly, the rotational amount of the circular spline 94b per unit rotational amount of the wave generator 94a (or, in other words, the actual reduction ratio of the wave gear device 94) changes.

Therefore, for example, the difference between the actual reduction ratio of the wave gear device 94 and the reference (rated) reduction ratio of the wave gear device 94 becomes an index that indicates the degree of elastic deformation of the flex spline 94c.

Thus, in the present embodiment, the difference between the actual reduction ratio and the reference reduction ratio of the wave gear device 94 is used to represent the amount of elastic deformation of the flex spline 94c, and this difference will be hereinafter referred to as "elastic deformation amount index DX". In this case, when the driving force (rotative driving force) acting on the circular spline 94b by the elastic force which is generated in accordance with the elastic deformation of the flex spline 94c (from the deformed state corresponding to the reference reduction ratio) is denoted as PW, and a stiffness coefficient (so-called spring constant) representing sensitivity of the change in the driving force PW to the change in the elastic deformation amount index DX of the flex spline 94c is denoted as Ke, then the relationship between DX and PW can be considered to be expressed by the following expression (13).

$$PW = DX \times Ke \quad (13)$$

While PW, DX, and Ke are the reference characters used in the first through third embodiments as well, in the present embodiment, they are used for the above-described meanings.

It should be noted that the polarity of the elastic deformation amount index DX depends on whether the actual reduction ratio of the wave gear device 94 is larger or smaller than the reference reduction ratio. In the present embodiment, for convenience of explanation, it will be defined that the elastic deformation amount index DX in the case where the actual reduction ratio of the wave gear device 94 is larger than the reference reduction ratio is of positive polarity. It will also be defined that the direction of the driving force PW which acts on the circular spline 94b by the elastic deformation of the flex spline 94c when the elastic deformation amount index DX is of positive polarity corresponds to the positive direction of the driving force PW.

Adjusting the elastic deformation amount index DX by the above expression (13) makes it possible to adjust the driving force (rotative driving force) PW acting on the circular spline 94b and, hence, to adjust the driving force transmitted from the input side of the wave gear device 94 (i.e. the electric motor 92 side) to the load member 93 side.

In order to control the driving force transmitted from the electric motor 92 to the load member 93, the power transmission device 91 of the present embodiment includes a control device 101, which is made up of an electronic circuit unit including a CPU, a RAM, a ROM, and so on, a speed sensor 102 for observing the rotational speed of the rotor (or the output shaft 92a) of the electric motor 92, and a speed sensor 103 for observing the rotational speed of the circular spline 94b which is the output section of the wave gear device 94. The outputs (detection signals) from the speed sensors 102 and 103 are input to the control device 101.

The speed sensor 102 is a rotary encoder, resolver, or other sensor mounted on the electric motor 92, as with the speed sensor 13 in the first embodiment, and it outputs a detection signal corresponding to the rotational speed (angular velocity) of the rotor of the electric motor 92.

Further, the speed sensor 103 is a rotary encoder, resolver, or other sensor mounted on the load member 93 coaxially with the wave gear device 94, and it outputs a detection signal corresponding to the rotational speed of the circular spline 94b of the wave gear device 94 (which is equal to the rotational speed of the load member 93).

Here, the value obtained by dividing the rotational speed (observed value) indicated by the output of the speed sensor 102 by the rotational speed (observed value) indicated by the output of the speed sensor 103 becomes a value indicating the observed value of the actual reduction ratio of the wave gear device 94. When the reference reduction ratio (which is a predetermined constant value) of the wave gear device 94 is subtracted from this observed value of the reduction ratio, then an observed value of the elastic deformation amount index DX of the flex spline 94c is obtained. Therefore, in the present embodiment, the speed sensors 102 and 103 are used as the sensors for observing the actual value of the aforesaid elastic deformation amount index DX.

The control device 101 includes, as a function implemented by an installed program or as a function implemented by a hardware configuration, a motor control section 105 which is responsible for operation control of the electric motor 92.

The motor control section 105 uses observed values of the rotational speeds, which are successively acquired on the basis of the outputs of the speed sensors 102 and 103, to determine a control manipulated variable (control input) of the electric motor 92 successively, as will be described later. The control manipulated variable is a desired rotational angular acceleration of the rotor of the electric motor 92, as in the first embodiment. It should be noted that the control manipulated variable may be a desired torque of the electric motor 92, for example.

The motor control section 105 then controls the electric current flowing through the electric motor 92, in accordance with the determined control manipulated variable, to perform the operation control of the electric motor 92.

In this case, the operation control of the electric motor 92 is performed in such a way as to restrict the magnitude of the driving force PW (rotative driving force) which acts on the circular spline 94b of the wave gear device 94 by the elastic deformation (corresponding to the elastic deformation amount index DX) of the flex spline 94c, or the temporal change rate of this driving force PW, to be within a required range.

The control processing performed by the motor control section 105 will now be described in detail. In the following description, when an actual value or its observed value of an arbitrary state quantity is indicated using reference characters, the suffix "_act" is added to the reference characters, as in the first embodiment.

Referring to FIG. 2, the motor control section 105 of the present embodiment includes, as its functions, the functions identical to those of the motor control section 15 of the first embodiment. That is, as with the motor control section 15 of the first embodiment, the motor control section 105 includes: a basic motor acceleration determining section 21, an inter-element driving force calculating section 22, an inter-element driving force change rate calculating section 23, an allowable range setting section 24, an upper driving force limit setting section 25, a first motor acceleration correction amount calculating section 26, a second motor acceleration correction amount calculating section 27, and a desired motor acceleration calculating section 28.

In this case, in the present embodiment, the basic motor acceleration determining section 21 is a functional section which determines a basic motor acceleration $\omega dot\_base$ as a basic desired value of the rotational angular acceleration $\omega dot$ (motor acceleration $\omega dot$) of the rotor of the electric motor 92, the inter-element driving force calculating section 22 is a functional section which acquires an observed value of an actual value PW_act of an inter-element driving force PW, which is the driving force acting on the circular spline 94b by the elastic deformation of the flex spline 94c, and the inter-element driving force change rate calculating section 23 is a functional section which acquires an observed value of an actual value PWdot_act of an inter-element driving force change rate PWdot, which is the temporal change rate (amount of change per unit time) of the inter-element driving force PW.

Further, the allowable range setting section 24 is a functional section which sets an inter-element driving force change rate allowable range as the allowable range for the inter-element driving force change rate PWdot, and the upper driving force limit setting section 25 is a functional section which sets an upper driving force limit PW_lim as the upper limit PW_lim of the magnitude (absolute value) of the inter-element driving force PW.

Further, the first motor acceleration correction amount calculating section 26 and the second motor acceleration correction amount calculating section 27 are functional sections which calculate a first motor acceleration correction amount $d\omega dot\_1$ and a second motor acceleration correction amount $d\omega dot\_2$, respectively, for correcting the basic motor acceleration $\omega dot\_base$, and the desired motor acceleration calculating section 28 is a functional section which performs arithmetic processing of correcting the basic motor acceleration $\omega dot\_base$ using the first motor acceleration correction amount $d\omega dot\_1$ and the second motor acceleration correction amount $d\omega dot\_2$.

The motor control section 105 of the present embodiment carries out the processing in the above-described functional sections, in a substantially similar manner as in the first embodiment. Therefore, in the following, a description will be made focusing on the matters different from the first embodiment.

At each control processing cycle, the motor control section 105 first carries out the processing in the basic motor acceleration determining section 21, the inter-element driving force calculating section 22, the inter-element driving force change rate calculating section 23, the allowable range setting section 24, and the upper driving force limit setting section 25.

The basic motor acceleration determining section 21 successively receives a desired load driving force PWout_cmd, which is a desired value of the driving force (rotative driving force) applied to the load member 93.

The desired load driving force PWout_cmd is determined successively in the control device 101 in accordance with the motional state of the load member 93 or the like, or it is supplied to the control device 101 from an external server or the like, as in the first embodiment. In the present embodiment, the desired load driving force PWout_cmd is also a desired value of the rotative driving force of the circular spline 94b of the wave gear device 94.

Then, at each control processing cycle, the basic motor acceleration determining section 21 determines a basic motor acceleration $\omega dot\_base$ from the input desired load driving force PWout_cmd, in accordance with a preset map or arithmetic expression, as in the first embodiment.

It should be noted that the way of determining the basic motor acceleration $\omega dot\_base$ is not limited to the above-described technique; an arbitrary technique may be adopted. For example, the technique explained in U.S. Pat. No. 5,910,720, for example, may be used to determine the basic motor acceleration $\omega dot\_base$.

Next, the inter-element driving force calculating section 22 successively receives an observed value of the actual elastic deformation amount index DX_act of the flex spline 94c. At each control processing cycle, the inter-element driving force calculating section 22 determines the value of PW that is calculated from the aforesaid expression (13) with DX_act substituted for DX on the right side of the expression, as an inter-element driving force PW_act (observed value).

Next, as in the first embodiment, the inter-element driving force change rate calculating section 23 carries out, at each control processing cycle, a differential operation of calculating a temporal change rate of the inter-element driving force PW_act calculated by the inter-element driving force calculating section 22, to determine an inter-element driving force change rate PWdot_act (observed value).

It should be noted that, as in the first embodiment, after the temporal change rate of the inter-element driving force PW_act is calculated by the differential operation, the calculated value may be subjected to low-pass filtering, and the resultant value may be obtained as the inter-element driving force change rate PWdot_act (observed value).

Further, the inter-element driving force change rate PWdot_act may be calculated by multiplying the temporal change rate of the elastic deformation amount index DX_act of the flex spline 94c (or the value obtained by subjecting this temporal change rate to low-pass filtering) by the stiffness coefficient Ke in the expression (13).

Next, the upper driving force limit setting section 25 successively receives an observed value of the actual rotational speed $\omega\_act$ of the rotor of the electric motor 92.

At each control processing cycle, the upper driving force limit setting section 25 determines an upper driving force limit PW_lim, in accordance with the processing identical to the processing described in the first embodiment (i.e. the processing described by referring to FIGS. 3 and 4).

In the present embodiment, however, the maximum allowable driving force PW_max which is determined as the upper driving force limit PW_lim in the case where the magnitude (absolute value) of the rotational speed $\omega\_act$ (observed value) of the rotor of the electric motor 92 is not smaller than the prescribed value $\omega a$ (see FIG. 3) corresponding to $\omega dot\_lim\_a$ (or, in other words, when $\omega dot\_lim \geq \omega dot\_lim\_a$) is a largest inter-element driving force corresponding to a largest elastic deformation amount index DX that is allowable for maintaining the meshing state of the flex spline 94c and the circular spline 94b in an appropriate state (where power transmission in the wave gear device 94 can be performed normally).

Such a maximum allowable driving force PW_max is set in advance by design or through experiments, as in the first embodiment.

Supplementally, the upper driving force limit setting section 25 may determine the upper driving force limit PW_lim directly in accordance with the rotational speed ω_act (observed value) of the rotor of the electric motor 92 (without performing the processing of determining ωdot_lim), as in the case described in the first embodiment.

Further, the upper driving force limit PW_lim in the case where the inter-element driving force PW_act is of positive polarity and the upper driving force limit PW_lim in the case where the inter-element driving force PW_act is of negative polarity may be set to different values. The same applies to the maximum allowable driving force PW_max or to a maximum allowable elastic deformation amount index DX_max which is the elastic deformation amount index DX of the flex spline 94c corresponding to the maximum allowable driving force PW_max.

Next, the aforesaid allowable range setting section 24 successively receives the inter-element driving force PW_act calculated by the inter-element driving force calculating section 22. At each control processing cycle, the allowable range setting section 24 sets an inter-element driving force change rate allowable range, so as to have the aforesaid characteristics 1 to 4, by the processing identical to the processing described in the first embodiment (i.e. the processing described by referring to FIG. 5).

In this case, however, DX regarding the aforesaid characteristics 1 to 3 is the elastic deformation amount index of the flex spline 94c in the present embodiment.

At each control processing cycle, the motor control section 105 carries out the processing in the basic motor acceleration determining section 21, the inter-element driving force calculating section 22, the inter-element driving force change rate calculating section 23, the allowable range setting section 24, and the upper driving force limit setting section 25 in the above-described manner, and thereafter, the motor control section 105 carries out the processing in the first motor acceleration correction amount calculating section 26 and the second motor acceleration correction amount calculating section 27.

The processing in the first motor acceleration correction amount calculating section 26 and that in the second motor acceleration correction amount calculating section 27 are identical to those in the first embodiment.

The motor control section 105 next performs the same computation as in the first embodiment (the computation of the aforesaid expression (4)) by the desired motor acceleration calculating section 28, to thereby determine a desired motor acceleration ωdot_cmd.

Then, the motor control section 105 controls the electric current flowing through the electric motor 92, in accordance with the desired motor acceleration ωdot_cmd determined as described above. Specifically, the motor control section 105 multiplies the desired motor acceleration ωdot_cmd by a prescribed value corresponding to the inertia of the rotating system of the rotor of the electric motor 92, to determine a desired torque (i.e. a desired value of the output torque) of the electric motor 92. The motor control section 105 then determines a desired value of the electric current flowing through the electric motor 92, in accordance with the desired torque determined. Further, the motor control section 105 performs feedback control on the electric current to cause the electric current (observed value) actually flowing through the electric motor to converge to the desired value.

In this manner, the rotor of the electric motor 92 is controlled to rotate at the desired motor acceleration ωdot_cmd.

According to the embodiment described above, basically, the rotational amount of the rotor of the electric motor 92 is controlled such that the driving force actually applied to the load member 93 from the electric motor 92 side via the wave gear device 94 tracks (converges to) the desired load driving force PWout_cmd.

When the load applied varies in this state, the flex spline 94c elastically deforms correspondingly, so the elastic deformation amount index DX_act changes. Consequently, the inter-element driving force PW_act between the flex spline 94c and the circular spline 94b varies.

With such a variation in the inter-element driving force PW_act, when the magnitude (absolute value) of the inter-element driving force PW_act exceeds the upper driving force limit PW_lim set in the upper driving force limit setting section 25, the desired motor acceleration ωdot_cmd is corrected by the first motor acceleration correction amount dωdot_1 ($\neq 0$) calculated by the aforesaid first motor acceleration correction amount calculating section 26. Thus, the wave generator 94a is rotatively driven by the electric motor 92 in such a way as to decrease the magnitude of the elastic deformation amount index DX of the flex spline 94c.

As a result, the magnitude (absolute value) of the elastic deformation amount index DX_act is prevented from becoming larger than the maximum allowable elastic deformation amount index DX_max corresponding to the aforesaid maximum allowable driving force PW_max. Consequently, the amount of elastic deformation of the flex spline 94c is adjusted such that the inter-element driving force PW_act will not become excessively large.

Further, in the case where the rotational speed ω_act of the rotor of the electric motor 92 becomes higher than the aforesaid prescribed rotational speed ωa, the upper driving force limit PW_lim is set such that its magnitude becomes smaller than the maximum allowable driving force PW_max, as in the first embodiment. This restricts the desired motor acceleration ωdot_cmd such that the output torque of the electric motor 92 will not exceed the torque that can be actually achieved during high-speed rotation of the rotor. As a result, it is possible for the electric motor 92 to drive the load member 93 appropriately.

Further, if the load applied varies relatively quickly, the flex spline 94c attempts to elastically deform quickly in correspondence therewith. This leads to an increase in magnitude of the inter-element driving force change rate PWdot_act.

At this time, in the case where the inter-element driving force change rate PWdot_act falls outside the inter-element driving force change rate allowable range set in the aforesaid allowable range setting section 24 (i.e. when PWdot_act has become larger than PWdot_lim_p or when PWdot_act has become smaller than PWdot_lim_n), the desired motor acceleration ωdot_cmd is corrected by the second motor acceleration correction amount dωdot_2 ($\neq 0$) calculated by the aforesaid second motor acceleration correction amount calculating section 27, as in the first embodiment.

Thus, the wave generator 94a is rotatively driven by the electric motor 92 such that the magnitude of the inter-element driving force change rate PWdot_act and, hence, the magnitude of the temporal change rate of the elastic deformation amount index DX_act of the flex spline 94c will not become excessively large.

Here, if the elastic deformation amount index DX_act of the flex spline 94c is apt to change quickly in response to a quick variation in the applied load, an inconvenience is liable to occur; for example, the meshing of the flex spline 94c and the circular spline 94b may be released, or slippage may occur between the meshing portions. Such an inconvenience is more likely to occur as the magnitude of the elastic deformation amount index DX_act of the flex spline 94c is larger.

In the present embodiment, however, the inter-element driving force change rate allowable range is set to have the aforesaid characteristic 1. Therefore, the magnitude of the inter-element driving force change rate PWdot_act and, hence, the magnitude of the temporal change rate of the elastic deformation amount index DX_act of the flex spline 94c are restricted to be smaller as the magnitude of the inter-element driving force PW_act is larger.

Further, in the state where the flex spline 94c has been deformed to a certain extent from the state corresponding to the reference reduction ratio of the wave gear device 94 (specifically, in the elastically deformed state corresponding to the range of 0<PW_act<PWa or the range of 0>PW_act>−PWa in FIG. 5), the meshing of the flex spline 94c and the circular spline 94b is more likely to become inappropriate, causing disengagement of the meshing or slippage at the meshing portions, in the case where the load applied varies quickly in the direction of decreasing the magnitude of the elastic deformation amount index DX_act of the flex spline 94c, as compared to the case where the load applied varies quickly in the direction of further increasing the magnitude of the elastic deformation amount index DX_act of the flex spline 94c.

This is because a sudden change in direction of the force acting on the circular spline 94b from the flex spline 94c is more likely to occur in the case where the load applied varies quickly in the direction of decreasing the magnitude of the elastic deformation amount index DX_act of the flex spline 94c.

In the present embodiment, however, the inter-element driving force change rate allowable range is set to have the aforesaid characteristic 2.

Therefore, in the state where the flex spline 94c has been deformed to a certain extent from the state corresponding to the reference reduction ratio of the wave gear device 94 so as to make the elastic deformation amount index DX_act take a positive value, the magnitude of the inter-element driving force change rate PWdot_act and, hence, the magnitude of the temporal change rate of the elastic deformation amount index DX_act are restricted to be smaller in the case where the inter-element driving force change rate PWdot_act takes a value (<0) in the direction of decreasing the magnitude of the elastic deformation amount index DX_act (>0) (or, decreasing the magnitude of the inter-element driving force PW_act (>0)), as compared to the case where it takes a value (>0) in the direction of increasing the magnitude of the elastic deformation amount index DX_act (>0) (or, increasing the magnitude of the inter-element driving force PW_act (>0)).

Further, in the state where the flex spline 94c has been elastically deformed so as to make the elastic deformation amount index DX_act take a negative value, the magnitude of the inter-element driving force change rate PWdot_act and, hence, the magnitude of the temporal change rate of the elastic deformation amount index DX_act are restricted to be smaller in the case where the inter-element driving force change rate PWdot_act takes a value (>0) in the direction of decreasing the magnitude of the elastic deformation amount index DX_act (<0) (or, decreasing the magnitude of the inter-element driving force PW_act (<0)), as compared to the case where it takes a value (<0) in the direction of increasing the magnitude of the elastic deformation amount index DX_act (<0) (or, increasing the magnitude of the inter-element driving force PW_act (<0)).

Furthermore, in the state where the magnitude (absolute value) of the elastic deformation amount index DX_act has become close to the aforesaid maximum allowable elastic deformation amount index DX_max (specifically, in the elastically deformed state of the flex spline 94c corresponding to the range of PW_max≥PW_act>PWa or the range of −PW_max≤PW_act<−PWa in FIG. 5), the meshing of the flex spline 94c and the circular spline 94b is more likely to become inappropriate in the case where the load applied varies quickly in the direction of further increasing the magnitude of the elastic deformation amount index DX_act, as compared to the case where the load applied varies quickly in the direction of decreasing the magnitude of the elastic deformation amount index DX_act.

This is because the elastic deformation amount index DX_act of the flex spline 94c is apt to change to a value equal to, or larger than, the maximum allowable elastic deformation amount index DX_max, and accordingly, the meshing portions of the flex spline 94c and the circular spline 94b would likely suffer disengagement or slippage.

In the present embodiment, however, the inter-element driving force change rate allowable range is set to have the aforesaid characteristic 3.

Therefore, the magnitude of the inter-element driving force change rate PWdot_act and, hence, the magnitude of the temporal change rate of the elastic deformation amount index DX_act are restricted to be smaller in the case where the inter-element driving force change rate PWdot_act takes a value in the direction of increasing the magnitude of the elastic deformation amount index DX_act of the flex spline 94c, as compared to the case where it takes a value in the direction of decreasing the magnitude of the elastic deformation amount index DX_act thereof.

Furthermore, the inter-element driving force change rate allowable range is set to have the aforesaid characteristic 4. Therefore, in the state where the magnitude of the elastic deformation amount index DX_act has reached the maximum allowable elastic deformation amount index DX_max, the inter-element driving force change rate PWdot_act is restricted so as not to take a value in the direction of further increasing the elastic deformation amount index DX_act (i.e. a value of the same direction (polarity) as PW_act).

In the above-described manner, the inter-element driving force change rate PWdot_act is restricted in such a way as to prevent it from falling outside the inter-element driving force change rate allowable range that is set in accordance with the inter-element driving force PW_act. Accordingly, the temporal change rate of the elastic deformation amount index DX_act of the flex spline 94c is adjusted such that the meshing state of the flex spline 94c and the circular spline 94b is maintained in an appropriate state and, hence, that the power transmission between the flex spline 94c and the circular spline 94b can be performed smoothly.

Therefore, according to the power transmission device 91 of the present embodiment, it is possible to transmit power from the electric motor 92 to the load member 93, while maintaining the meshing state of the flex spline 94c and the circular spline 94b in the wave gear device 94 in an appropriate state.

Modifications

In each embodiment described above, the power transmission device 1, 41, 71, or 91 having a rotary actuator (electric motor 2, 42, or 92) as the actuator was described.

Alternatively, a direct-acting actuator such as a linear motor may be used as the actuator. Still alternatively, the actuator may be a hydraulic actuator.

Further, in the aforesaid third embodiment, the nut 44 served as the driving element and the screw shaft 75 served as the driven element. Alternatively, it may be configured such that the nut 44 serves as the driven element and the screw shaft 75 serves as the driving element.

Further, in each of the aforesaid embodiments, when the magnitude of the inter-element driving force PW_act reached the maximum allowable driving force PW_max, the limit (upper limit PWdot_lim_p or lower limit PWdot_lim_n) of the inter-element driving force change rate allowable range in the direction of further increasing the magnitude of the inter-element driving force PW_act was set to zero. Alternatively, the limit may be set to have the polarity in the direction of decreasing the magnitude of the inter-element driving force PW_act.

That is, the inter-element driving force change rate allowable range may be set such that PWdot_lim_p<0 when PW_act=PW_max (>0) and that PWdot_lim_n>0 when PW_act=−PW_max (<0).

What is claimed is:

1. A power transmission device performing power transmission between an actuator which outputs a rotational driving force and a load member which is to be driven, the power transmission device comprising:
    a driving element and a driven element disposed on a path for the power transmission as elements responsible for the power transmission on the path, the driving and driven elements respectively having teeth and tooth grooves meshed with each other, the driving and driven elements being configured such that the power transmission at meshing portions is performed via an elastic force which is generated by elastic deformation of an elastic member; and
    a control device that controls an amount of elastic deformation of the elastic member by controlling the actuator to thereby control an inter-element driving force which is a driving force transmitted from the driving element to the driven element, wherein
    the control device includes an allowable range setting section that sets an inter-element driving force change rate allowable range as an allowable range of a change rate of the inter-element driving force such that the allowable range changes in accordance with an observed value of the elastic deformation amount of the elastic member, and
    the control device is configured to control the inter-element driving force in such a way as to restrict the change rate of the inter-element driving force to be within the inter-element driving force change rate allowable range set by the allowable range setting section.

2. The power transmission device according to claim 1, wherein the allowable range setting section is configured to set the inter-element driving force change rate allowable range such that the inter-element driving force change rate allowable range becomes narrower as the magnitude of the observed value of the elastic deformation amount of the elastic member becomes larger.

3. The power transmission device according to claim 2, wherein the allowable range setting section is configured to set the inter-element driving force change rate allowable range such that, in a case where the magnitude of the observed value of the elastic deformation amount of the elastic member takes a value falling within a prescribed range which is smaller than a setting value of a maximum allowable deformation amount of the elastic member, a center value of the inter-element driving force change rate allowable range becomes a value in a direction of increasing the elastic deformation amount.

4. The power transmission device according to claim 3, wherein the allowable range setting section is configured to set the inter-element driving force change rate allowable range such that, in a case where the magnitude of the observed value of the elastic deformation amount of the elastic member takes a value larger than the values within the prescribed range, the center value of the inter-element driving force change rate allowable range becomes a value in a direction of decreasing the elastic deformation amount.

5. The power transmission device according to claim 1, wherein
    the actuator is an electric motor, and
    the control device further comprises an inter-element driving force upper limit setting section that sets an upper limit of a magnitude of the inter-element driving force variably, in accordance with an observed value of an operating speed of an output section of the electric motor, within a range of not larger than a maximum allowable value for the magnitude of the inter-element driving force which is defined by a preset maximum allowable deformation amount of the elastic member, and
    the control device is configured to control the inter-element driving force in such a way as to restrict the change rate of the inter-element driving force to be within the inter-element driving force change rate allowable range set by the allowable range setting section and also to restrict the magnitude of the inter-element driving force to be equal to or smaller than the upper limit set by the inter-element driving force upper limit setting section.

6. The power transmission device according to claim 1, wherein the driving element is a worm and the driven element is a worm wheel meshed with the worm, and an outer periphery portion of the worm meshing with the worm wheel is configured of the elastic member that is elastically deformable in a shaft center direction of the worm.

7. The power transmission device according to claim 1, wherein the driving element is a nut of a ball screw mechanism and the driven element is a screw shaft of the ball screw mechanism, and an outer periphery portion of the screw shaft meshing with the nut via balls is configured of the elastic member that is elastically deformable in a shaft center direction of the screw shaft.

8. The power transmission device according to claim 1, wherein the driving element is one of a nut and a screw shaft of a ball screw mechanism and the driven element is the other of the nut and the screw shaft of the ball screw mechanism, and balls interposed between the nut and the screw shaft are each configured of the elastic member that is elastically deformable in a shaft center direction of the screw shaft.

9. The power transmission device according to claim 1, wherein the driving element is a flex spline of a wave gear device and the driven element is a circular spline of the wave gear device, and the flex spline constitutes the elastic member.

* * * * *